US008873522B2

(12) United States Patent
Meylan et al.

(10) Patent No.: US 8,873,522 B2
(45) Date of Patent: Oct. 28, 2014

(54) PROCESSING MEASUREMENT GAPS IN A WIRELESS COMMUNICATION SYSTEM

(75) Inventors: Arnaud Meylan, San Diego, CA (US); Srividhya Krishnamoorthy, San Diego, CA (US); Shailesh Maheshwari, San Diego, CA (US); Vanitha A. Kumar, San Diego, CA (US); Sudhir Halbhavi, San Diego, CA (US); Vikas Nagpal, San Diego, CA (US); Udayan Bhawnani, San Diego, CA (US); Scott A. Hoover, Del Mar, CA (US); Steve Hannagan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1432 days.

(21) Appl. No.: 12/501,019

(22) Filed: Jul. 10, 2009

(65) Prior Publication Data
US 2010/0034158 A1 Feb. 11, 2010

Related U.S. Application Data

(60) Provisional application No. 61/087,930, filed on Aug. 11, 2008.

(51) Int. Cl.
*H04W 80/04* (2009.01)
*H04L 1/18* (2006.01)
*H04W 24/10* (2009.01)
*H04W 36/00* (2009.01)
*H04L 5/14* (2006.01)
*H04L 5/00* (2006.01)

(52) U.S. Cl.
CPC ............ *H04L 1/1854* (2013.01); *H04W 24/10* (2013.01); *H04W 36/0088* (2013.01); *H04L 5/1469* (2013.01); *H04W 36/0094* (2013.01); *H04L 5/0023* (2013.01); *H04L 5/0037* (2013.01); *H04L 5/0091* (2013.01)
USPC .......................................... 370/338; 455/437

(58) Field of Classification Search
CPC ............ H04W 36/0088; H04W 24/10; H04W 72/1268
USPC .................................... 370/328, 338; 455/437
See application file for complete search history.

(56) References Cited

U.S. PATENT DOCUMENTS 5,404,355 A 4/1995 Raith
6,473,399 B1 10/2002 Johansson et al.
(Continued)

FOREIGN PATENT DOCUMENTS

CN 101043713 A 9/2007
EP 1351448 A1 10/2003
(Continued)

OTHER PUBLICATIONS

Ericsson, "R2-062859: Semi Persistent Scheduling," Oct. 2006, pp. 1-15, Internet Citation, XP002496512.
(Continued)

*Primary Examiner* — Mark Rinehart
*Assistant Examiner* — Matthew Hopkins
(74) *Attorney, Agent, or Firm* — Nerrie M. Zohn

(57) ABSTRACT

In a wireless communication system, user equipment (UE) is provided, one or more set of rules are provided for the UE to handle the processing during a measurement gap. In some aspects, the gap measurement may be ignored. In some aspects, the processing is stored and handled at a later in time and gap measurements are performed. Depending on the system, the measurements performed during the gaps may be UE implementation dependent, wherein the UE determines whether to perform the measurement for a given gap. In some instances, the UE may not perform measurements during the gap, thereby giving priority to other processing, such as RACH processing. Depending on the type of processing required (DL-SCH, UL-SCH, TTI bundling, RACH or SR), the UE may store requests and process the measurements during the gap or ignore the gap measurement as if there were no gaps.

20 Claims, 16 Drawing Sheets

(56) References Cited

U.S. PATENT DOCUMENTS

| | | | |
|---|---|---|---|
| 6,597,679 | B1 | 7/2003 | Willars |
| 7,813,312 | B2 * | 10/2010 | Castor et al. ............ 370/328 |
| 2003/0189949 | A1 | 10/2003 | Belaiche |
| 2007/0097914 | A1 | 5/2007 | Grilli et al. |
| 2007/0097991 | A1 | 5/2007 | Tatman |
| 2008/0186919 | A1 | 8/2008 | Huang et al. |
| 2009/0191883 | A1 * | 7/2009 | Choi et al. ............ 455/450 |
| 2009/0274086 | A1 | 11/2009 | Petrovic et al. |
| 2010/0034126 | A1 | 2/2010 | Kitazoe et al. |
| 2010/0035624 | A1 * | 2/2010 | Tseng ............ 455/450 |
| 2014/0071919 | A1 | 3/2014 | Kitazoe et al. |

FOREIGN PATENT DOCUMENTS

| | | |
|---|---|---|
| EP | 1565023 A2 | 8/2005 |
| EP | 1909523 A1 | 4/2008 |
| JP | 2006052946 A | 2/2006 |
| JP | 2006121172 A | 5/2006 |
| JP | 2007034675 A | 2/2007 |
| JP | 2010516185 A | 5/2010 |
| JP | 2011527859 A | 11/2011 |
| RU | 2149518 | 5/2000 |
| RU | 2235432 C2 | 8/2004 |
| TW | 200820803 A | 5/2008 |
| WO | 0035224 A1 | 6/2000 |
| WO | WO2005109725 | 11/2005 |
| WO | WO2006121693 | 11/2006 |
| WO | 2008001726 A1 | 1/2008 |
| WO | 2008040448 A1 | 4/2008 |
| WO | 2008076063 A2 | 6/2008 |
| WO | 2008082347 A1 | 7/2008 |
| WO | 2008085952 A1 | 7/2008 |
| WO | WO-2010006008 A2 | 1/2010 |

OTHER PUBLICATIONS

Ericsson: "UL Transmissions during Measurement Gaps" 3GPP Draft; R2-083355, 3rd Generation Partnership Project (3GPP), Mobile Competence Centre; 650, Route Des Lucioles; F-06921 Sophia-Antipolis Cedex ; France, vol. RAN WG2, no. Warsaw, Poland; Jun. 24, 2008, XP050140755.

Nokia Corporation, Nokia Siemens Networks, Samsung: "Measurement Gaps and UL activity", R2-083105, 3GPP TSG-RAN WG2 Meeting #62bis, Warsaw, Poland, Jun. 30-Jul. 4, 2008.

Qualcomm Europe: "MAC interaction with measurement gaps", R2-083867, 3GPP TSG-RSN WG2 #63, Aug. 18-22, 2008, URL, http://www.3gpp.org/ftp/tsg_ran/WG2_RL2/TSGR2_63/Docs/R2-083867.zip.

Qualcomm Europe: "Measurement gap scheduling", 3GPP Draft; R2-060058, 3rd Generation Partnership Project (3GPP), Mobile Competence Centre ; 650, Route Des Lucioles ; F-06921 Sophia-Antipolis Cedex ; France, vol. RAN WG2, no. Sophia Antipolis, France; Jan. 5, 2006, XP050130222, [retrieved on Jan. 5, 2006].

Samsung: "Uplink Bundling: "Bundle" and Feedback", R2-083480, 3GPP TSG-RAN2 Meeting #62-bis, Warsaw, Poland Jun. 30-Jul. 4, 2008, URL, http://www.3gpp.org/ftp/tsg_ran/WG2_RL2/TSGR2_62bis/Docs/R2-083480.zip.

Taiwan Search Report—TW098127010—TIPO—Jan. 27, 2013.

Written Opinion—PCT/US2009/053478—International Search Authority—European Patent Office—Apr. 28, 2010.

3GPP Organizational Partners Arib et al: 3GPP TS 36.321 V8.2.0—Evolved Universal Terrestrial Radio Access (E-UTRA) Medium Access Control (MAC) Protocol Specs Rel. 8. 3rd Gen Partnership Project Technical Specs Group Radio Access Network vol. 36.321. No. V8.2.0 May 1, 2008 pp. 1-33.

International Search Report PCT/US09/053478 International Search Authority European Patent Office Apr. 28, 2010.

TSG-RAN WG1: LS on L1 Impact of Measurement Gaps 3GPP Draft; R2-083059-R1-082222, 3rd Gen Partnership Project Mobile Competence Centre 650 Route Des Lucioles vol. RAN WG2, no. Warsaw, Poland Jun. 14, 2008 pp. 1-2.

Taiwan Search Report—TW098127010—TIPO—Nov. 6, 2013.

* cited by examiner

PROCESSING MEASUREMENT GAPS IN A WIRELESS COMMUNICATION SYSTEM

CLAIM OF PRIORITY UNDER 35 U.S.C. §119

The present application for patent claims priority to Provisional Application No. 61/087,930 entitled "A Method and Apparatus for Processing Measurement Gaps in a Wireless Communication System" filed Aug. 11, 2008, assigned to the assignee hereof and hereby expressly incorporated by reference herein in its entirety.

CROSS REFERENCE TO RELATED APPLICATIONS

The present application is related to co-pending and commonly assigned U.S. patent application Ser. No. 12/500,996 entitled "A Method and Apparatus for Processing Measurement Gaps in a Wireless Communication System" filed on even date herewith, which in turn claims priority to Provisional Application No. 61/087,541 entitled "A Method and Apparatus for Processing Measurement Gaps in a Wireless Communication System" filed Aug. 8, 2008, the disclosures of both of which are hereby expressly incorporated by reference in their entirety.

FIELD OF INVENTION

The exemplary and non-limiting aspects described herein relate generally to wireless communications systems, methods, computer program products and devices, and more specifically to techniques for processing measurement gaps.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-Bs and Radio Network Controllers which make up the UMTS core network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node Bs. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Measurement gaps are assigned by a network, such as a source base station, to user equipment so that user equipment (UE) can tune from a source carrier frequency to target carrier frequency to perform measurements for inter-frequency and/or inter-Radio Access Technology (RAT) cells. This can be particularly helpful for UE that lacks a dual mode receiver and thus cannot monitor two base stations. Thereby, mobility of UE is facilitated by being able to more quickly perform a handover when required or advantageous. Conventionally, during a measurement gap the UE does not transmit any data and is not expected to tune its receiver on a serving carrier frequency (e.g., E-UTRAN).

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with measurement gaps assigned and processed for user equipment to identify and measure inter-frequency and/or inter-RAT cells.

In one aspect, a method is provided for processing a measurement gap by receiving a radio resource control (RRC) assignment on a downlink for a measurement gap for tuning from a source carrier frequency to a target carrier frequency, determining a scheduling conflict for complying with the measurement gap, and performing a medium access control (MAC) process in accordance with a protocol predefined for the scheduling conflict.

In another aspect, at least one processor is provided for processing a measurement gap. A first module receives a radio resource control (RRC) assignment on a downlink for a measurement gap for tuning from a source carrier frequency to a target carrier frequency. A second module determines a scheduling conflict for complying with the measurement gap. A third module performs a medium access control (MAC) process in accordance with a protocol predefined for the scheduling conflict.

In an additional aspect, a computer program product is provided for processing a measurement gap. A computer-readable storage medium comprises a first set of codes for causing a computer to receive a radio resource control (RRC)

assignment on a downlink for a measurement gap for tuning from a source carrier frequency to a target carrier frequency. A second set of codes causes the computer to determine a scheduling conflict for complying with the measurement gap. A third set of codes causes the computer to perform a medium access control (MAC) process in accordance with a protocol predefined for the scheduling conflict.

In another additional aspect, an apparatus is provided for processing a measurement gap. Means are provided for receiving a radio resource control (RRC) assignment on a downlink for a measurement gap for tuning from a source carrier frequency to a target carrier frequency. Means are provided for determining a scheduling conflict for complying with the measurement gap. Means are provided for performing a medium access control (MAC) process in accordance with a protocol predefined for the scheduling conflict.

In a further aspect, an apparatus is provided for processing a measurement gap. A receiver receives a radio resource control (RRC) assignment on a downlink for a measurement gap for tuning from a source carrier frequency to a target carrier frequency. A computing platform determines a scheduling conflict for complying with the measurement gap. The computing platform performs a medium access control (MAC) process via a transmitter and the receiver in accordance with a protocol predefined for the scheduling conflict.

In yet one aspect, a method is provided for assigning a measurement gap by transmitting a radio resource control (RRC) assignment on a downlink for a measurement gap for tuning from a source carrier frequency to a target carrier frequency and enabling user equipment to determine a scheduling conflict for complying with the measurement gap and to perform a medium access control (MAC) process in accordance with a protocol predefined for the scheduling conflict.

In yet another aspect, at least one processor is provided for assigning a measurement gap. A first module transmits a radio resource control (RRC) assignment on a downlink for a measurement gap for tuning from a source carrier frequency to a target carrier frequency. A second module enabling user equipment to determine a scheduling conflict for complying with the measurement gap and to perform a medium access control (MAC) process in accordance with a protocol predefined for the scheduling conflict.

In yet an additional aspect, a computer program product is provided for assigning a measurement gap. Computer-readable storage medium comprises a first set of codes for causing a computer to transmit a radio resource control (RRC) assignment on a downlink for a measurement gap for tuning from a source carrier frequency to a target carrier frequency. A second set of codes causes the computer to enable user equipment to determine a scheduling conflict for complying with the measurement gap and to perform a medium access control (MAC) process in accordance with a protocol predefined for the scheduling conflict.

In yet another additional aspect, an apparatus is provided for assigning a measurement gap. Means are provided for transmitting a radio resource control (RRC) assignment on a downlink for a measurement gap for tuning from a source carrier frequency to a target carrier frequency. Means are provided for enabling user equipment to determine a scheduling conflict for complying with the measurement gap and to perform a medium access control (MAC) process in accordance with a protocol predefined for the scheduling conflict.

In yet a further aspect, an apparatus is provided for assigning a measurement gap. A transmitter transmits a radio resource control (RRC) assignment on a downlink for a measurement gap for tuning from a source carrier frequency to a target carrier frequency. Computing platform enabling user equipment via the transmitter and a receiver to determine a scheduling conflict for complying with the measurement gap and to perform a medium access control (MAC) process in accordance with a protocol predefined for the scheduling conflict.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
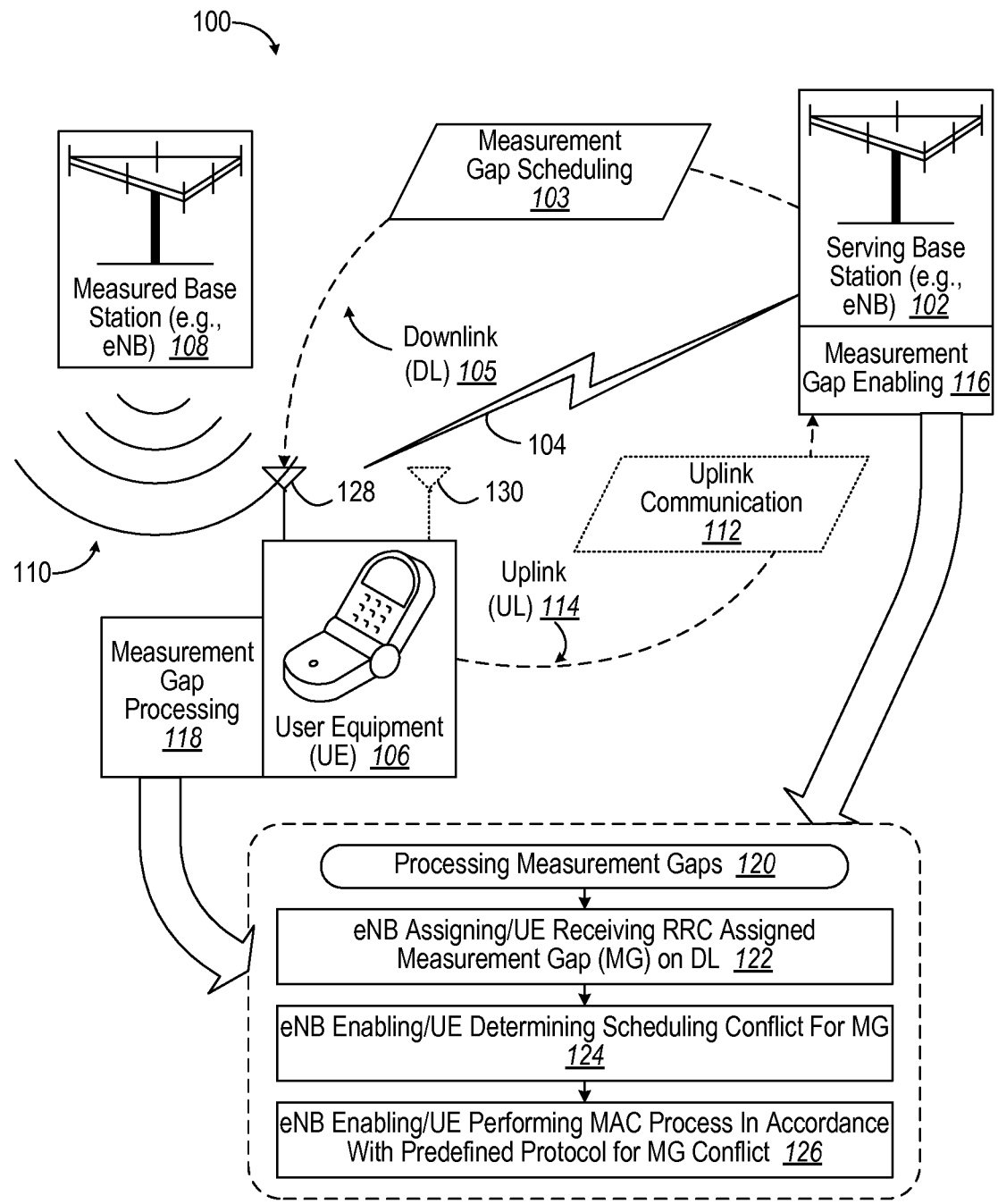
FIG. 1 illustrates a block diagram of a communication system wherein a base station assigns measurement gaps that are processed by user equipment to switch from a source to a target carrier frequency.

In wireless communication system, there are predetermined measurement gaps (a portion in time where UE performs predetermined in transmission, wherein the UE will perform predefined measurements gaps. Depending on the wireless system, the frequency of the gaps varies. However, certain other functions that are dynamic may collide with known gaps, such RACH processing, processing using HARQ scheme or transmission during bundled TTI (for example, 4 TTI's at a given time).

According to some aspects, one or more set of rules are provided for the UE to handle the processing during a measurement gap. In some aspects, the gap measurement may be ignored. In some aspects, the processing is stored and handled at a later in time and gap measurements are performed. Depending on the system, the measurements performed during the gaps may be UE implementation dependent, wherein the UE determines whether to perform the measurement for a given gap. In some instances, the UE may not perform measurements during the gap, thereby giving priority to other processing, such as RACH processing.

Depending on the type of processing required (DL-SCH, UL-SCH, TTI bundling, RACH or SR—see attached), the UE may store requests and process the measurements during the gap or ignore the gap measurement as if there were no gaps.

In an illustrative aspect, measurement gaps exist for a radio resource control (RRC) connected state ("RRC_CONNECTED") for UE to identify and measure inter-frequency and/or inter-RAT (Radio Access Technology) cells. Conventionally during the measuring (monitoring) gaps the UE is prohibited from transmitting any data and is not expected to tune its receiver on the source (e.g., E-UTRAN serving) carrier frequency. Measurement gaps may be requested by UE or assigned by eNB in response to some measurement event. The aspects described herein assume that the gaps are configured; UE needs most of them to perform measurement.

Therefore there is no need to have rules to improve performance when UE does not need to perform measurements during a measurement gap. In order to ensure that measurement gaps are only configured when really needed one of the options below is disclosed. For instance, if eNB initiated, then UE must be able to indicate (capability) "never give me gaps, I don't need them". In connected mode, measurement gaps can be eNB initiated, similar to UMTS. A parameter can define for each supported E-UTRA band whether measurement gaps are required to perform measurements on each other supported E-UTRA radio frequency band and on each supported RAT/band combination. Alternatively or in addition, if measurement gaps are UE initiated, UE can request gaps only when needed.

With regard to downlink shared channel(s) (DL-SCH) that are dynamically allocated, a DL-SCH that happens just before measurement makes the ACK/NAK feedback collide with the measurement. In an aspect, exemplary rules are described for this instance. UE can process DL-SCH received before measurement (buffer HARQ data). UE does not send ACK/NAK during measurement (i.e., after RRC is done with processing gap configuration). MAC has been told about the gaps. UE does not send ACK/NAK. UE may be prepared to handle subsequent non-adaptive retransmissions for that process (HARQ state). During a measurement, UE does not process DL-SCH nor sends UL ACK/NAK because an eNB using PDCCH during measurement gap is an error case.

With regard to Semi-Persistent allocation, in an aspect, DL Semi persistent assignment applies only to first transmissions. By definition the UE does not need to process a DL semi-persistent assignment that occurs during a measurement gap. The eNB may want to re-allocate that DL-SCH and UL ACK/NAK resource to another UE. The same behavior can be as described as dynamic DL-SCH. To be explicit, SPS (Semi-Persistent Scheduling) DL-SCH that happens just before measurement gap makes the ACK/NAK feedback collide with the measurement. UE process SPS DL-SCH received before measurement. UE does not send ACK/NAK during measurement. UE must be prepared to handle non-adaptive retransmissions for that process. For an instance wherein SPS DL-SCH occurs during a measurement, UE does not possess SPS DL-SCH nor sends UL ACK/NAK. HARQ however behaves as if a DL-SCH grant was received and expects a DL-SCH retransmission. Even during a gap, the not-received SPS grant flips the NDI bit. Should it be the case, then SPS virtual grant occurs during gap. Thereby the forgoing, SPS occasions do not have to shift because of measurement gaps.

With regard to dynamic allocation of uplink synchronization channel(s) (UL-SCH), in an aspect, the PDCCH for uplink grant occurs in 3 ms before the UL-SCH transmission. Therefore it is possible to receive uplink grant before the gap, indicating a grant valid during the gap.

By having the UL-SCH grant received 3 ms or less before gap, then it is easier to build packet and not have different behavior because of upcoming gap or not. Packet build can occur followed by skipping transmission, since L1 is tuned away. Can count UL-SCH as transmitted and NAK'ed (i.e., similar to a non-adaptive retransmission). Can use a rule that if UE misses first transmission of UL-SCH due to measurement gap, then cancel the grant and consider UL-SCH NAK'ed (i.e., non-adaptive retransmission.

In an aspect for a UL-SCH grant during gap, UE does not receive UL grant during measurement gap. UE does not transmit on PUSCH during measurement gap. Non-adaptive retransmissions colliding with the measurement gap are canceled and regarded as NAK. UE resumes retransmission at next occasion. When a DL ACK/NAK cannot be received due to measurement gap, UE behaves as if ACK is received. PDCCH can be used to resume retransmissions.

With regard to Semi-Persistent allocation, UL semi-persistent scheduling (SPS) applies to UL first transmission as well as UL synchronous retransmissions. The eNB may want to re-allocate the semi-persistently allocated UL-SCH resource during a measurement gap to another UE, and know that UE in gap will never use it. In an illustrative aspect, UE does not proceed with a semi-persistent UL-SCH new transmission that occurs during a measurement gap, MAC PDU is built, transmission is skipped, and the UL-SCH is considered to be NAK'ED, triggering UL non-adaptive transmission.

To summarize the UL-SCH, UE may never receive PDCCH during measurement gap; all transmissions that occur during the measurement gap are withheld and regarded as NAK'ED (e.g., SPS just before gap. SPS during gap, dynamic grant for first transmission or retransmission just before gap, non adaptive retransmission during gap).

With regard to TTI bundling on the uplink (UL), consider three cases. First, when the end of a TTI bundle collides with measurement gap and thus so does the ACK/NAK feedback, then the beginning of TTI bundle is transmitted with the colliding end of the TTI bundle withheld. The UE behaves as if ACK is received (suspend). (Alternatively, the UE could consider it a NAK.) PDCCH can be used to resume. When the beginning of the TTI bundle collides with measurement gap, the UE transmits the end of the TTI bundle and looks for actual ACK/NAK feedback because UE can see it. When the whole bundle collides with the measurement gap, the UE withholds the whole TTI bundle and considers it NAK'ed. Per UL-SCH rules above, all transmissions that collide with gap are canceled, and whatever part of the bundle (e.g., beginning, end) does not overlap with gap is transmitted.

In an illustrative aspect, DL ACK/NAK feedback is sent relative to the last TTI of the bundle. For example, if a TTI bundle has four (4) subframes, the ACK/NAK timing is relative to the fourth subframe, irrespective if the fourth subframe is transmitted or not.

With regard to medium access control (MAC) needing to use random access channel (RACH) procedures during a measurement gap, in general UE can autonomously use the shared PRACH (physical random access channel) resource at any time. In an illustrative scenario when UE has a Measurement Report to send. In particular, more measurements may not be needed and sending the Measurement Report without delay is preferable. For example, a handover could be triggered as a result of the report. Alternatively, in some implementations it can be simpler to disallow use of PRACH during measurement gaps, although this can create problems in certain situations. In an exemplary implementation, it can thus be preferable to allow UE autonomy with regard to use of PRACH during a measurement gap. If RRC connect state is re-established reselecting the same cell, the UE can advantageously keep the measurement configuration or not. It could also create challenges if measurement gap has priority over uplink data arrival. In some aspects, the UE can be required to use RACH during measurement gap or alternatively to delay RACH prioritizing measurement.

By providing a commitment to ongoing RACH over a measurement gap, a connected UE configured with measurement gaps can ensure completion of the procedure.

Facilitating eNB operation is advantageous when SR is not assigned. UE may have initiated RACH before an upcoming measurement gap. UE is not expected to "look forward" to future gaps before performing autonomous transmissions. In particular, consider when message 2, message 3 or message 4 collide with a measurement gap. For message 2 (Random Access Response (RAR)), consequences if missed can be that UE will retransmit PRACH at next occasion after RAR response window expires, generating extra PRACH and RAR load.

For message 3 (first UL-SCH message), note that with contention based RACH eNB does not know which C-RNTI is getting that grant, so eNB cannot avoid collisions of MSG3 with measurement gaps. Consider that UE receives RAR that schedules a first UL TX during the gap, which the UE can be left with either measuring or transmitting, can be forced to proceed with message 3 transmission, or forced to perform the measurement. If the latter, eNB does not know if UE did not transmit due to gap. eNB may NAK that transmission to trigger non-adaptive transmission. It is deemed undesirable to state that when a first transmission is skipped, it is regarded as NAK and non adaptive retransmissions follow. (However, note that for a particular case, SR should be assigned.) eNB could trigger adaptive transmission. It can complicate eNB implementation somewhat if UE performs the measurement. In an exemplary aspect, the UE can perform the measurement even if RACH is ongoing, but UE can also respond to RACH.

For message 4 (contention resolution message), consider that by the time MSG4 is transmitted for UE that is connected and has measurement gaps, the eNB can avoid sending the MSG4 during a gap. Note that a Contention Resolution Timer can be selected appropriately. Having ongoing RACH takes precedence over measurements can provide better system performance.

With regard to anticipating measurement gaps before initiating RACH, if alternatively measurement gaps are given priority over RACH, then the UE may benefit from taking future measurement gaps into account before initiating RACH. In particular, if the RAR window partly overlaps with a measurement gap, or the window of transmission of message 3 overlaps with the gap, the UE may want to delay the PRACH transmission.

With regard to service requests (SR), in one aspect consider UE using SR during a measurement gap, which allows UEs which do not need to use a measurement gap and have pending uplink traffic to expedite the request for UL traffic. eNB can react to SR by either scheduling the UE after the gap is over or interpret that UE using SR during a measurement gap means that the UE has canceled the need for that measurement. UL and DL can be scheduled from there on. Alternatively consider that UE does not use SR during a measurement gap with a requisite loss in UE flexibility but can then delay SR until after measurement.

In an illustrative implementation regarding L1 related aspects for the specification of measurement gaps for inter-RAT and inter-frequency measurements in E-UTRA, a single measurement gap duration of 6 ms that can be periodically "scheduled" (e.g., up to one measurement gap each 10 ms). With regard to measurement gap location, the measurement gap consists of a multiple number of subframes and can be aligned with DL subframe timing at the UE. With regard to UE behavior for transmissions overlapping with the measurement gap, UE does not retransmit on PUSCH in a subframe where it is configured to perform a measurement.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Referring initially to FIG. 1, a communication system 100 of a base station, depicted as an evolved base node (eNB) 102, communicates measurement gap scheduling 103 via an over-the-air (OTA) link 104 with user equipment (UE) 106. In an illustrative aspect, measurement gaps exist for an RRC_CONNECTED state for UE 106 are used to measure inter-frequency and/or inter-Radio Access Technology (RAT) cell, depicted as a target eNB 108. Advantageously, an overly simplistic approach is avoided for always preventing the source eNB 102 from not transmitting any data during the measurement gap and requiring the UE 106 to tune to a target carrier frequency 110 for the target eNB 108. The measurement gaps are configured with radio resource control (RRC) and in some aspects RRC can specify a maximum processing time for that procedure. In one aspect, the medium access control (MAC) is configured by RRC with the measurement gaps at any time before the maximum processing time, and therefore the eNB 102 performs a role in enabling efficient use of measurement gaps. In particular, appropriate measurements are performed in certain instances, and appropriate uplink communications 112 are transmitted/received respectively over an uplink 114.

In particular, a measurement gap enabling component 116 of the source eNB 102 and a measurement gap processing component 118 of the UE 106 act in concert to perform a methodology or sequence of operations 120 for assigning/processing measurement gaps. In block 122, the eNB assigns and the UE receives a radio resource control (RRC) assignment on a downlink for a measurement gap for tuning from a source carrier frequency to a target carrier frequency. The eNB enables and the UE determines a scheduling conflict for complying with the measurement gap (block 124) and performs a medium access control (MAC) process in accordance with a protocol predefined for the scheduling conflict (block 126). Thereby, if the UE 106 having one available transceiver (e.g., Tx, Rx) 128 rather than being dual mode as depicted at 130 can make appropriate use of the measurement gap scheduling 103.

Figure 2A:
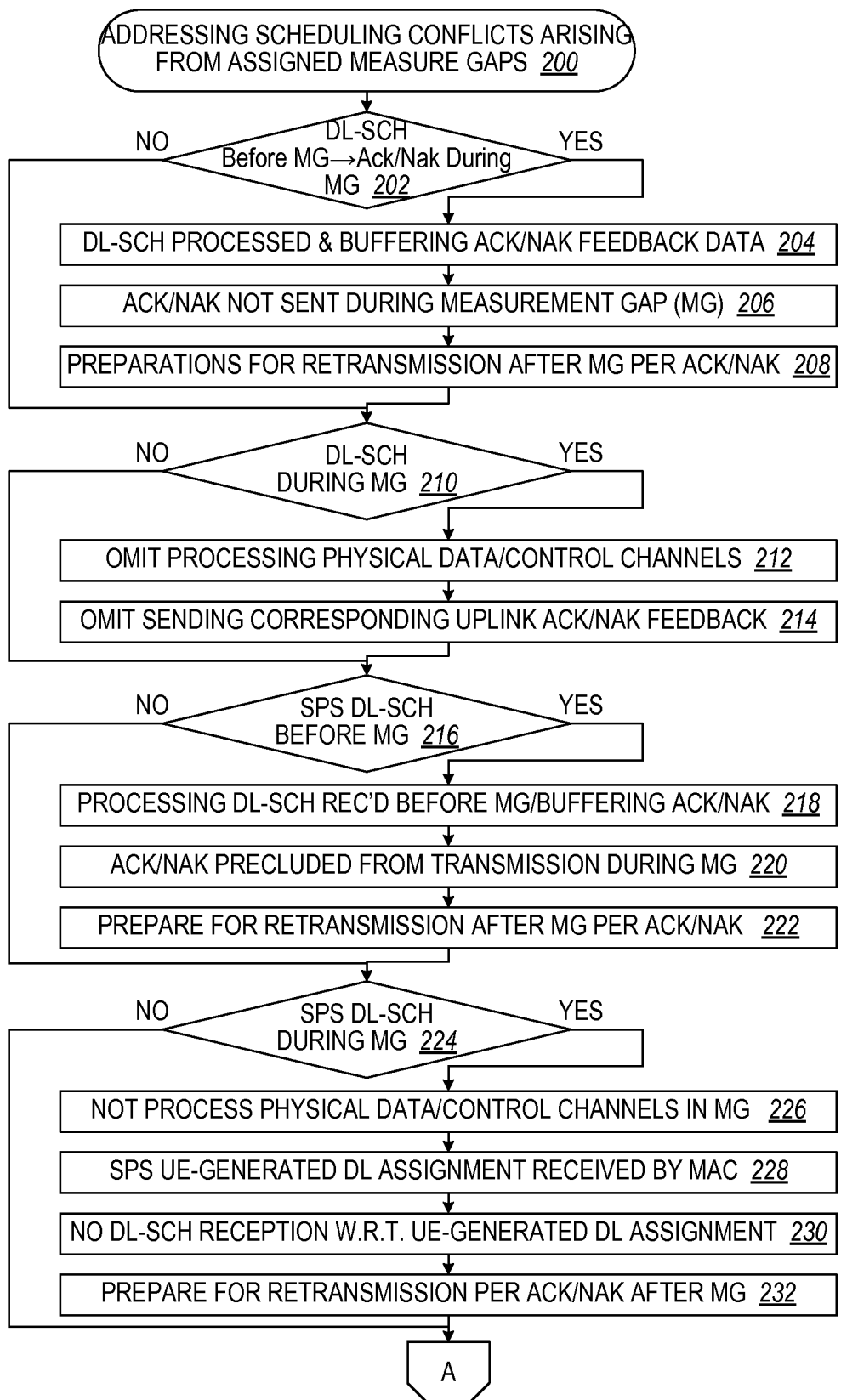
FIGS. 2A-2C illustrates a flow diagram of a methodology or sequence of operations for addressing scheduling conflicts arising from assigned measure gaps.

In FIG. 2A, a methodology or sequence of operations 200 is depicted for specific examples for addressing scheduling conflicts arising from the assigned measure gaps. In block 202, if a determination is that the scheduling conflict arises from downlink shared channel (DL-SCH) occurring before the measurement gap prompting uplink acknowledgement/not acknowledgement (Ack/Nak) feedback that occurs during the measurement gap, then the MAC process is performed in accordance with the protocol predefined for the scheduling conflict by processing downlink shared channel received before the measurement gap and buffering ACK/NAK feedback data (block 204). ACK/NAK feedback is precluded from being sent during measurement gap (block 206). Preparations are made for retransmission after the measurement gap in accordance with ACK/NAK feedback (block 208).

In block 210, if a determination is made that the scheduling conflict arises from downlink shared channel (DL-SCH) occurring during the measurement gap. If so, MAC process is performed in accordance with the protocol predefined for the scheduling conflict by omitting processing of physical data and control channels during measurement gap (block 212), and omitting sending corresponding uplink ACK/NAK feedback (block 214).

In block 216, a determination is made that the scheduling conflict arises from semi-persistent allocation of downlink shared channel (DL-SCH) occurring before the measurement gap prompting uplink acknowledgement/not acknowledgement (ACK/NAK) feedback that occurs during the measurement gap. If so, the MAC process is performed in accordance with the protocol predefined for the scheduling conflict by processing downlink shared channel received before the measurement gap and buffering ACK/NAK feedback data (block 218). Ack/Nak feedback is precluded from being sent during measurement gap (block 220). Preparations are made for retransmission after the measurement gap in accordance with ACK/NAK feedback (block 222).

In block 224, a determination is made that the scheduling conflict arises from semi-persistent allocated downlink shared channel (DL-SCH) occurring during the measurement gap wherein a semi-persistently scheduled (SPS) first transmission is constructively received. If so, the MAC process is performed in accordance with the protocol predefined for the scheduling conflict by omitting processing of physical data and control channels during measurement gap (block 226). SPS user equipment (UE)-generated downlink assignment is received by MAC (block 228). Reception is omitted for DL-SCH with respect to UE-generated downlink assignment (block 230). Preparations are made for retransmission after the measurement gap in accordance with ACK/NAK feedback (block 232).

Figure 2B:
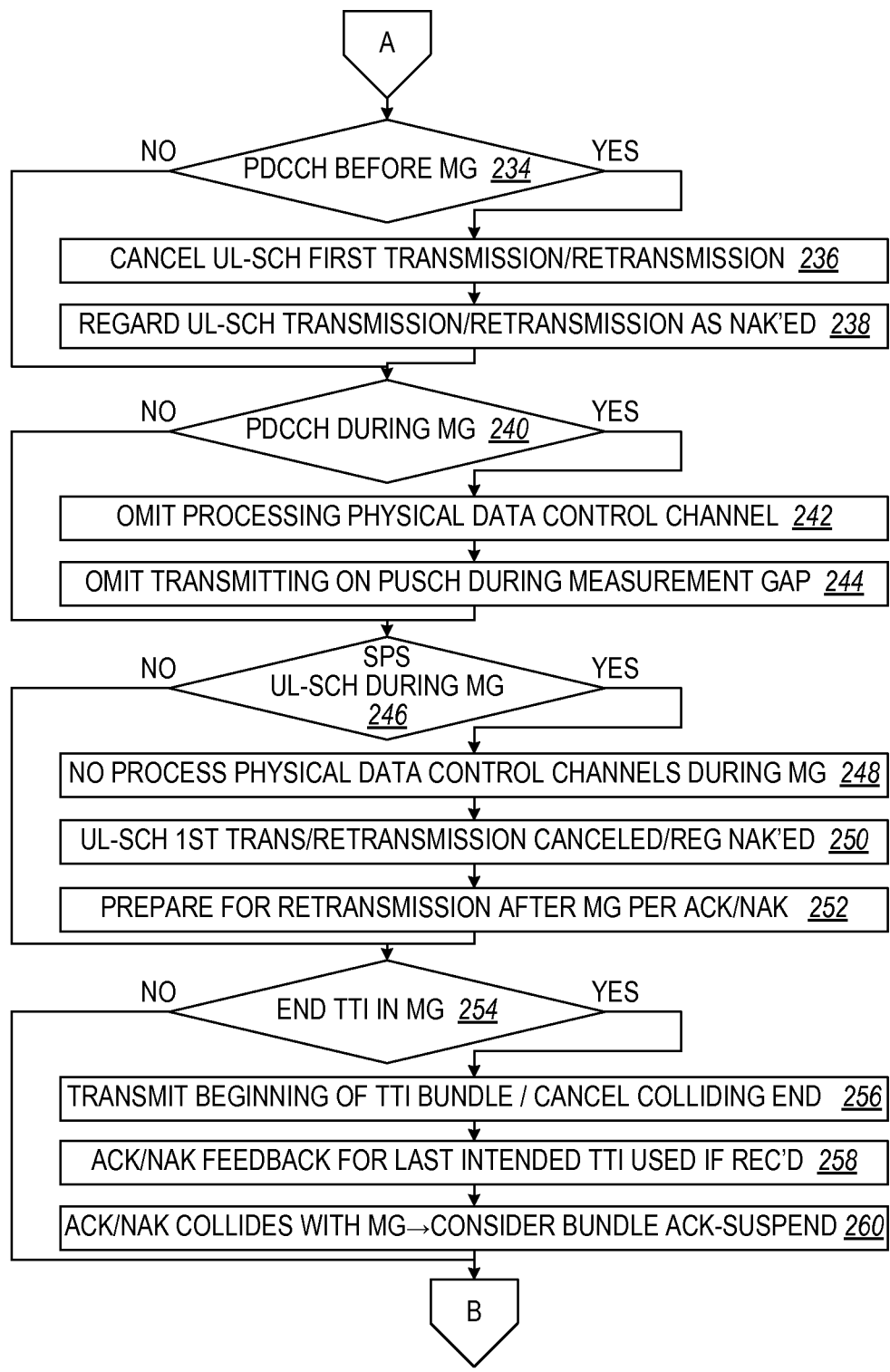
Figure 2C:
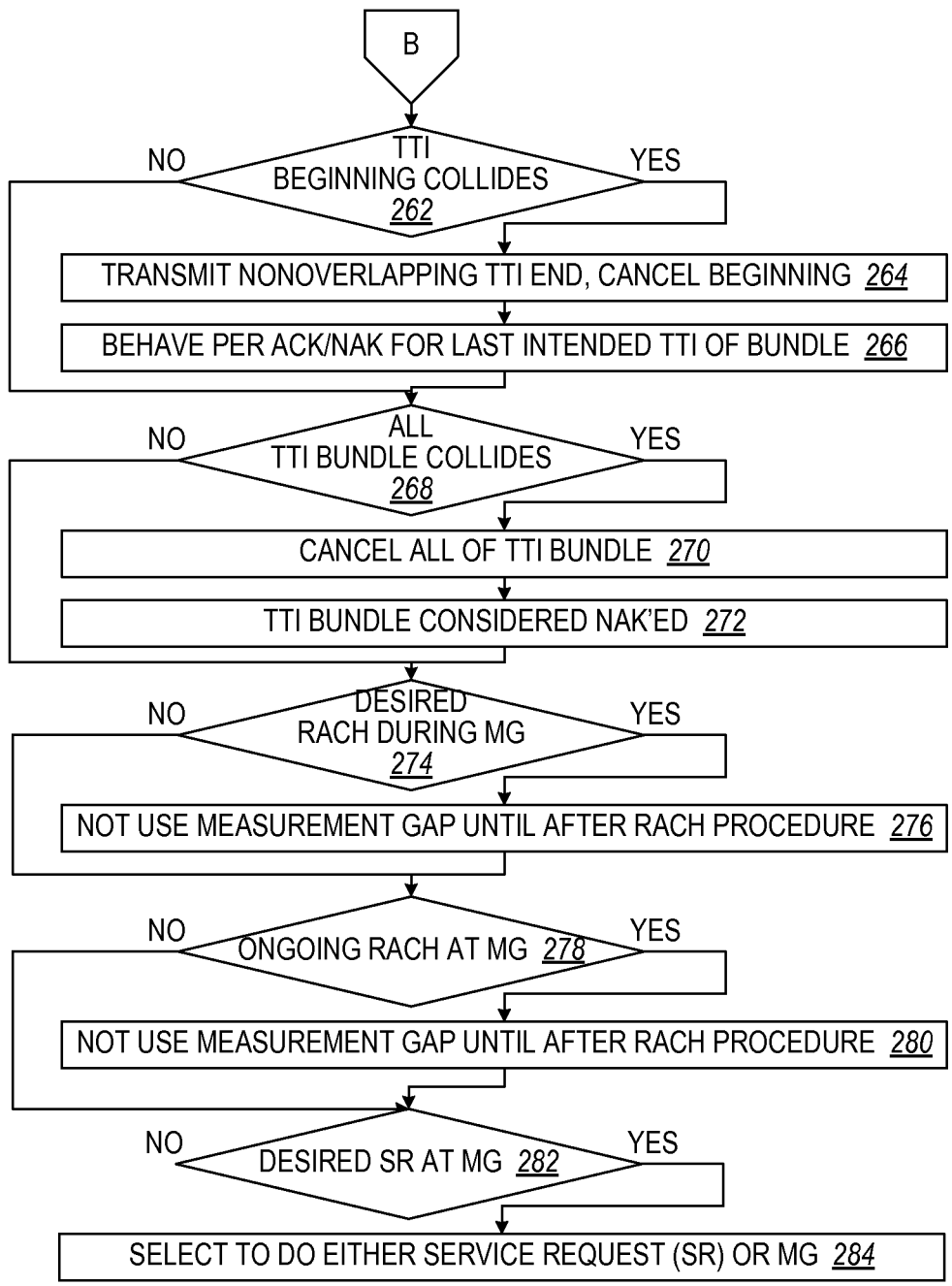

Continuing in FIG. 2B with block 234, a determination is made that the scheduling conflict arises from physical downlink control channel (PDCCH) occurring before the measurement gap prompting uplink acknowledgement/not acknowledgement (ACK/NAK) feedback that occurs during the measurement gap. If so, the MAC process is performed in accordance with the protocol predefined for the scheduling conflict by canceling uplink shared channel (UL-SCH) first transmission or retransmission (block 236). The UL-SCH first transmission or retransmission is regarded as not acknowledged (NAK'ED) (block 238).

In block 240, a determination is made that the scheduling conflict arises from physical downlink control channel (PDCCH) occurring during the measurement gap. If so, the MAC process is performed in accordance with the protocol predefined for the scheduling conflict by omitting processing of physical data control channel during measurement gap (block 242). Transmitting on physical uplink shared channel (PUSCH) is omitted during measurement gap (block 244).

In block 246, a determination is made that the scheduling conflict arises from semi-persistently allocated uplink shared control channel (UL-SCH) occurring during the measurement gap. If so, the MAC process is performed in accordance with the protocol predefined for the scheduling conflict by omitting processing of physical data and control channels during measurement gap (block 248). The UL-SCH first transmission or retransmission is canceled and regarding as not acknowledged (Nak'ed) (block 250). Preparations are made for retransmission after the measurement gap in accordance with ACK/NAK feedback (block 252).

In block 254, a determination is made that the scheduling conflict arises from an end of a transmission time interval (TTI) bundle colliding with the measurement gap. If so, the MAC process is performed in accordance with the protocol predefined for the scheduling conflict by transmitting a beginning portion of the TTI bundle that does not overlap with the measurement gap and canceling the colliding end (block 256). ACK/NAK feedback for last intended TTI of bundle is used if received (block 258). Else, if ACK/NAK feedback collides with measurement gap, this bundle is considered acknowledged (ACK) by suspending (block 260).

In block 262, a determination is made that the scheduling conflict arises from a beginning of a transmission time interval (TTI) bundle colliding with the measurement gap. If so, the MAC process is performed in accordance with the protocol predefined for the scheduling conflict by transmitting an ending portion of the TTI bundle that does not overlap with the measurement gap and canceling the beginning (block 264). Behavior is in accordance with ACK/NAK feedback received for last intended TTI of the bundle (block 266).

In block 268, a determination is made that the scheduling conflict arises from a transmission time interval (TTI) bundle colliding with the measurement gap. If so, the MAC process is performed in accordance with the protocol predefined for the scheduling conflict by canceling all transmission for the TTI bundle (block 270). The TTI bundle is considered not acknowledged (Nak) for the TTI bundle (block 272).

In block 274, a determination is made that the scheduling conflict arises from a desired use of random access channel (RACH) procedure with the measurement gap. If so, the MAC process is performed in accordance with the protocol predefined for the scheduling conflict by selecting one of utilizing the measurement gap and utilizing the RACH procedure (block 276).

In block 278, a determination is made that the scheduling conflict arises from ongoing use of random access channel (RACH) procedure with the measurement gap. If so, the MAC process is performed in accordance with the protocol predefined for the scheduling conflict by not using the measurement gap until the RACH procedure completes (block 280).

In block 282, a determination is made that the scheduling conflict arises from a desired use of service request (SR) during the measurement gap. If so, the MAC process is performed in accordance with the protocol predefined for the scheduling conflict by selecting one of utilizing the measurement gap and transmitting a service request (block 284).

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple (NR) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 3:
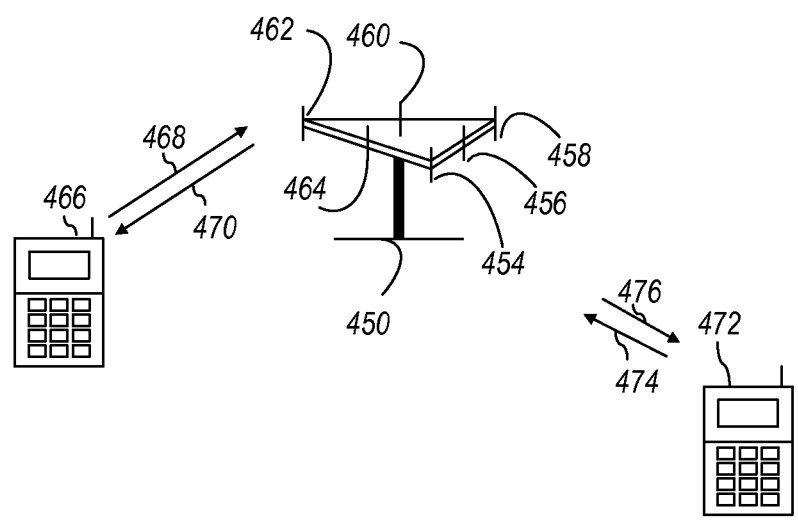
FIG. 3 illustrates a diagram of a multiple access wireless communication system according to one aspect for processing measurement gaps.

Referring to FIG. 3, a multiple access wireless communication system according to one aspect is illustrated. An access point 450 (AP) includes multiple antenna groups, one including 454 and 456, another including 458 and 460, and an additional including 462 and 464. In FIG. 3, only two antennas are shown for each antenna group, however, more or fewer antennas may be utilized for each antenna group. Access terminal (AT) 466 is in communication with antennas 462 and 464, where antennas 462 and 464 transmit information to access terminal 466 over forward link 470 and receive information from access terminal 466 over reverse link 468. Access terminal 472 is in communication with antennas 456 and 458, where antennas 456 and 458 transmit information to access terminal 472 over forward link 476 and receive information from access terminal 472 over reverse link 474. In a FDD system, communication links 468, 470, 474 and 476 may use different frequency for communication. For example, forward link 470 may use a different frequency then that used by reverse link 468. Each group of antennas and/or the area in which they are designed to communicate is often referred to as a sector of the access point 450. In the aspect, antenna groups each are designed to communicate to access terminals 466, 472 in a sector of the areas covered by access point 450.

In communication over forward links 470 and 476, the transmitting antennas of access point 450 utilize beamforming in order to improve the signal-to-noise ratio of forward links for the different access terminals 466 and 474. Also, an access point using beamforming to transmit to access terminals scattered randomly through its coverage causes less interference to access terminals in neighboring cells than an access point transmitting through a single antenna to all its access terminals.

An access point 450 may be a fixed station used for communicating with the terminals and may also be referred to as an access point, a Node B, or some other terminology. An access terminal 466, 472 may also be called user equipment (UE), a wireless communication device, terminal, access terminal or some other terminology.

Figure 4:
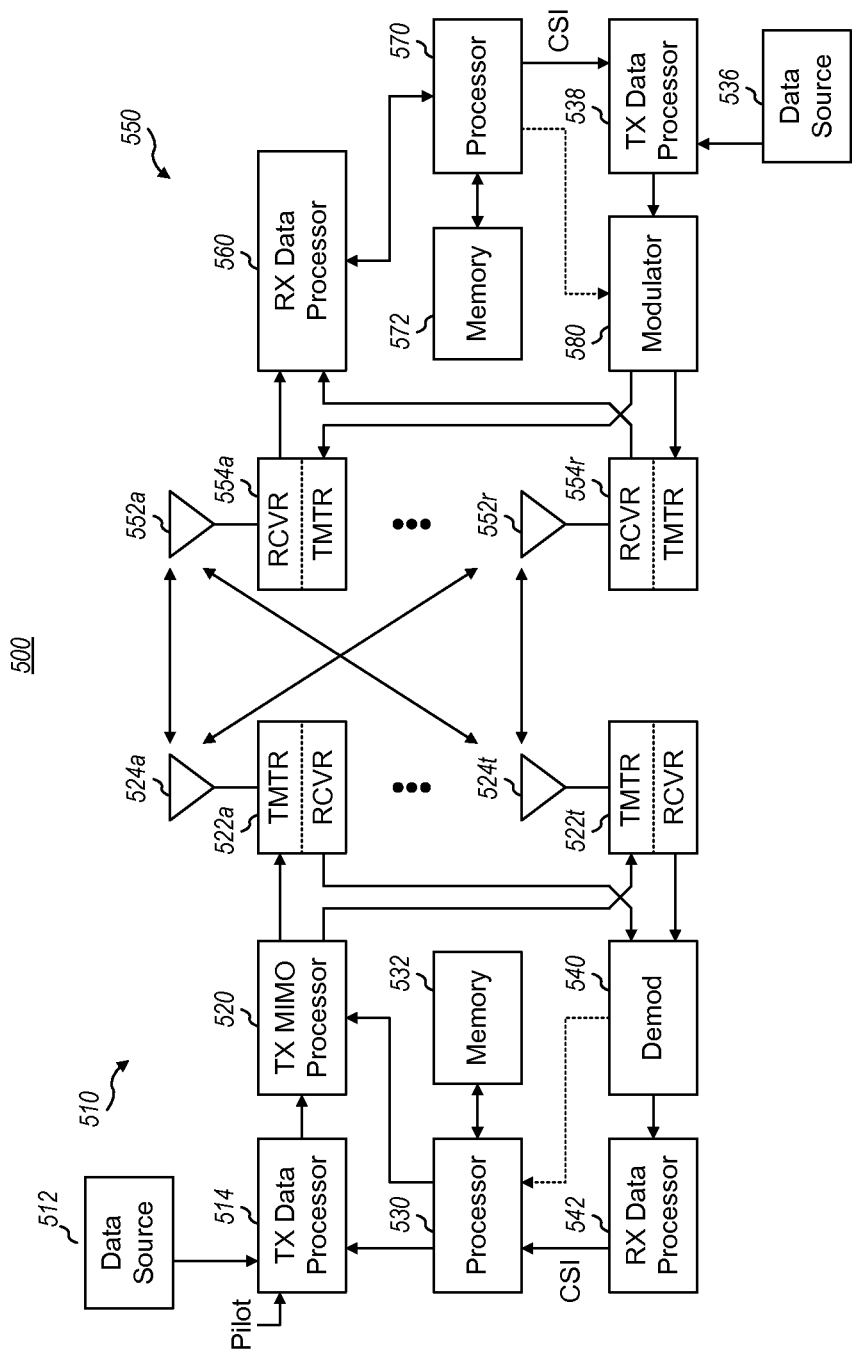
FIG. 4 illustrates a schematic block diagram of a communication system for processing measurement gaps.

FIG. 4 is a block diagram of an aspect of a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an aspect, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530 using memory 532.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain implementations, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion using memory 572.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SD-CCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 5:
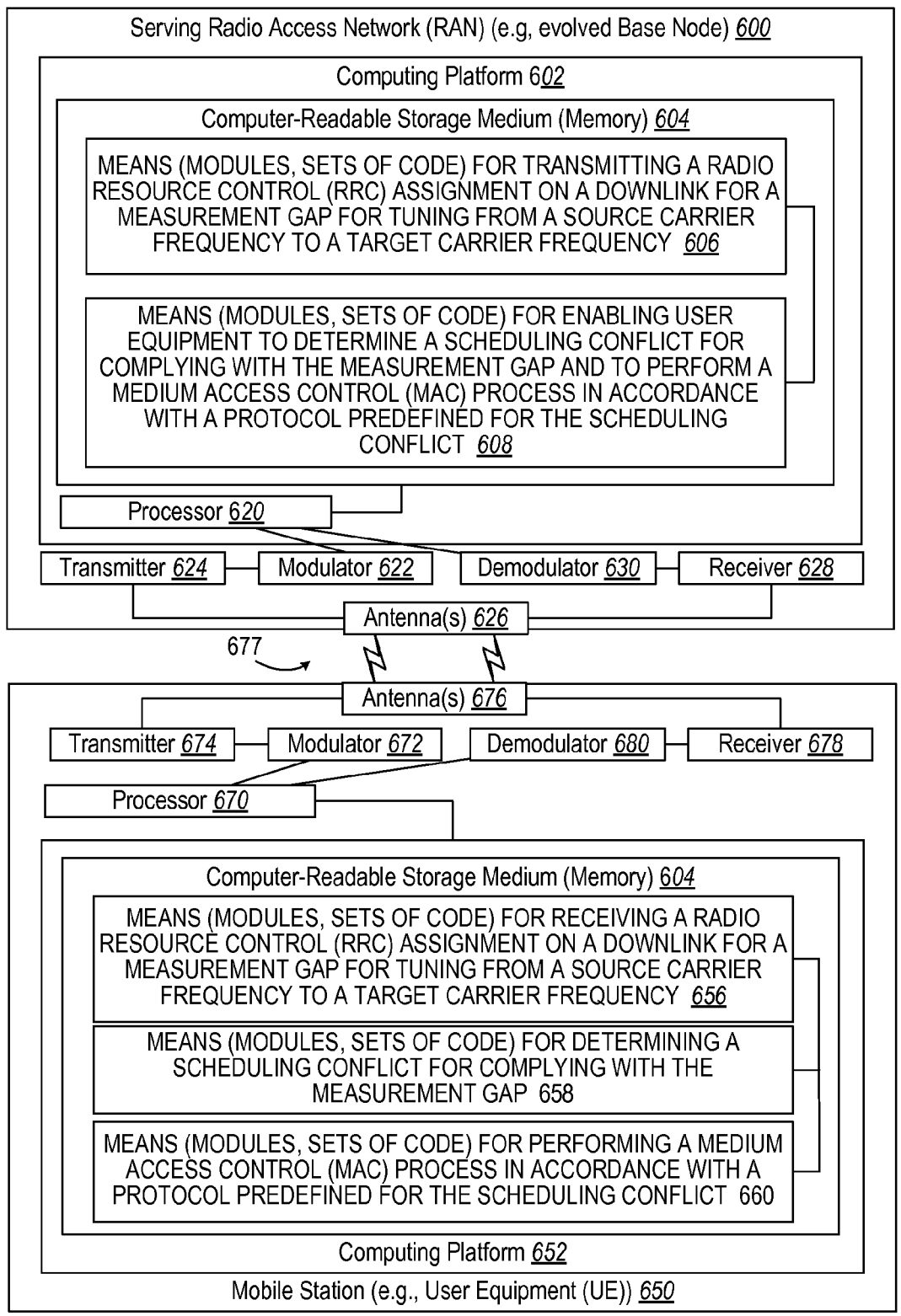
FIG. 5 illustrates a block diagram of a base station and user equipment for assigning and processing respectively measurement gaps.
Figure 6A:
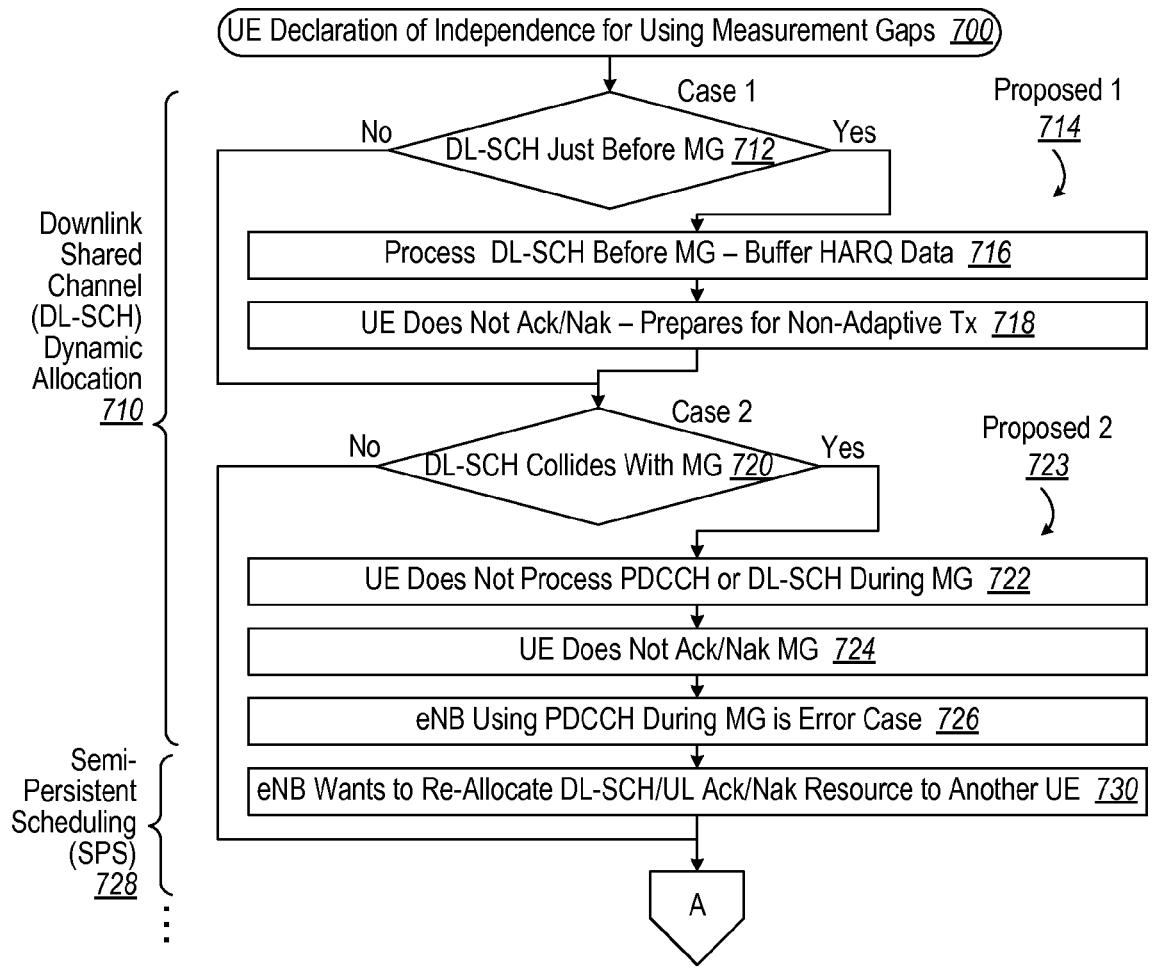
FIG. 6A-6G illustrates a flow diagram of a methodology or sequence of operations for processing measurement gaps.
Figure 6B:
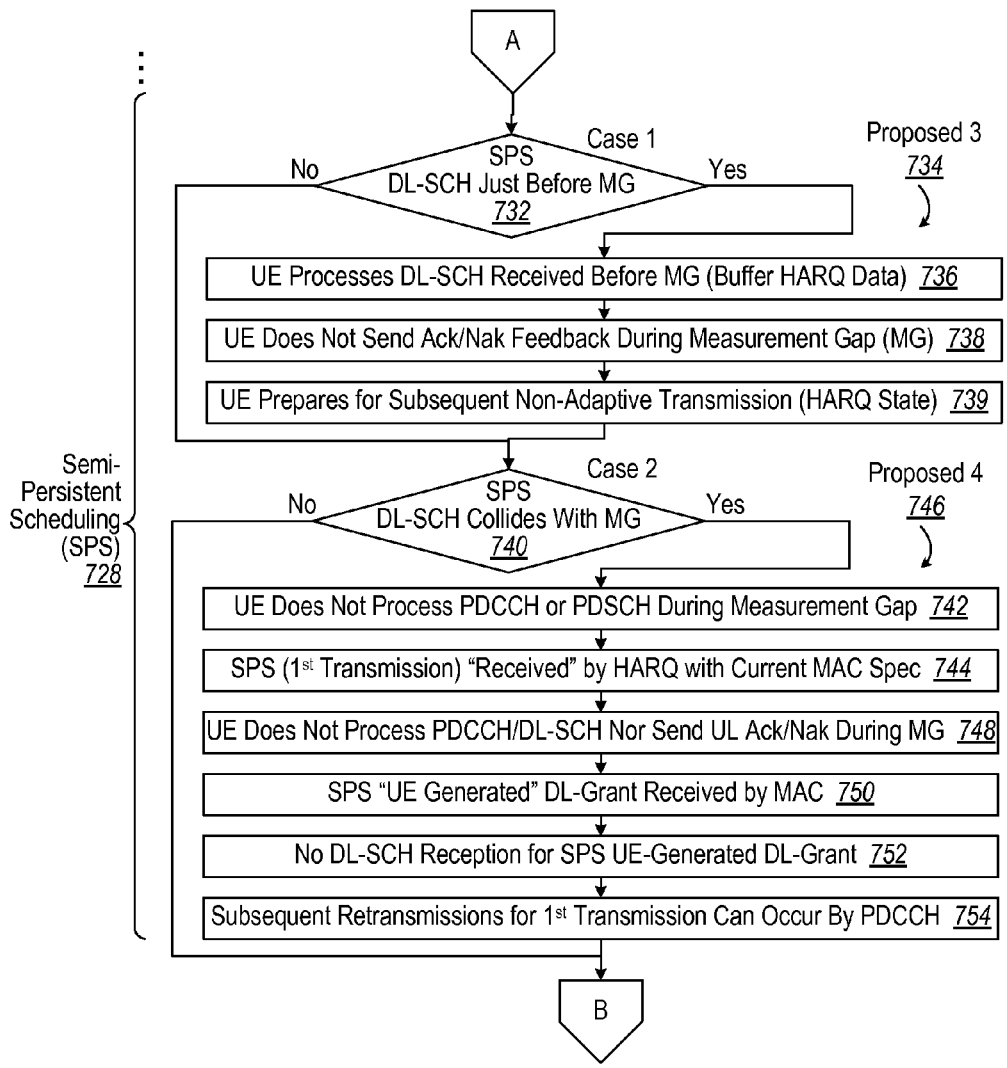
Figure 6C:
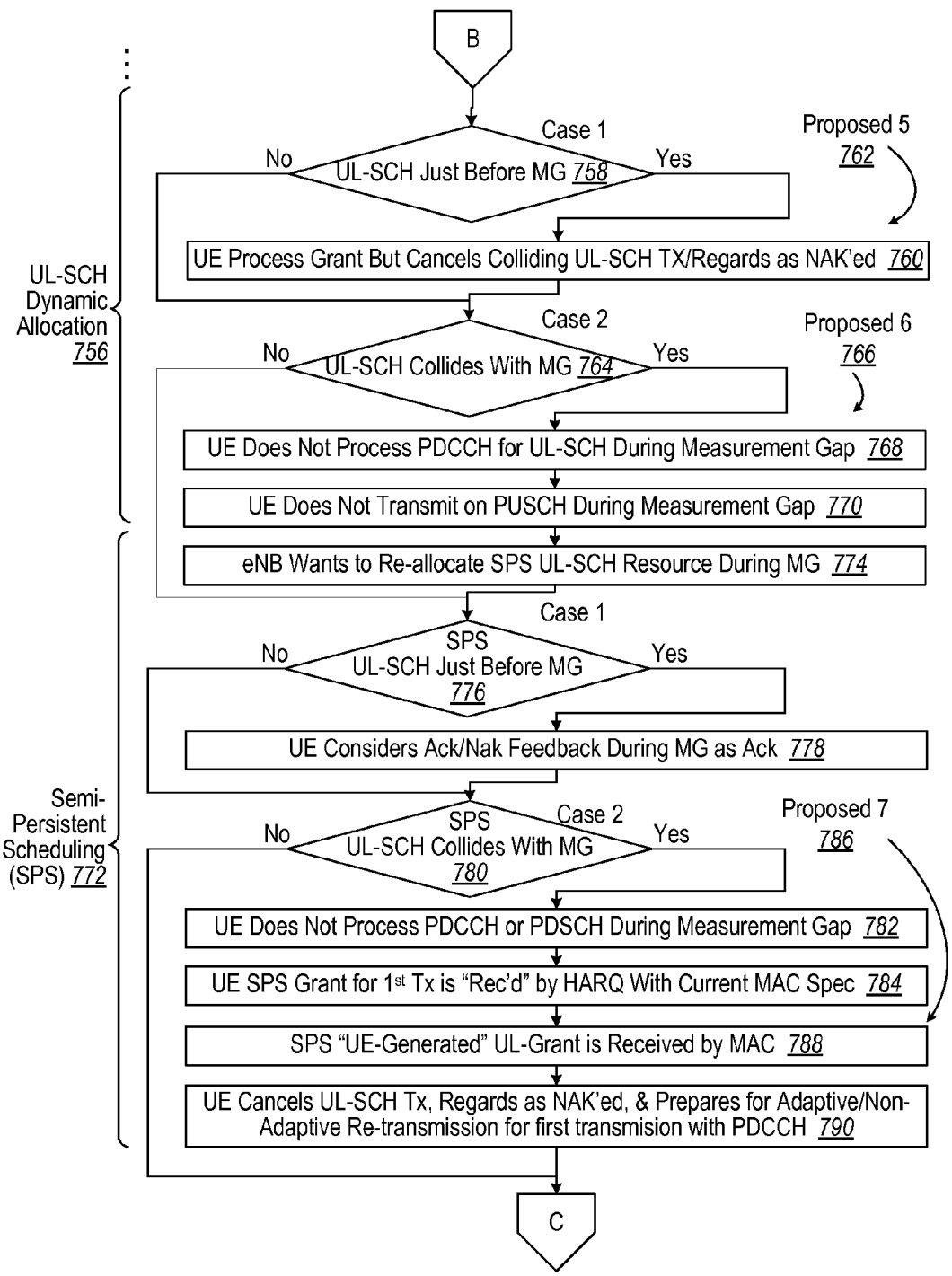
Figure 6D:
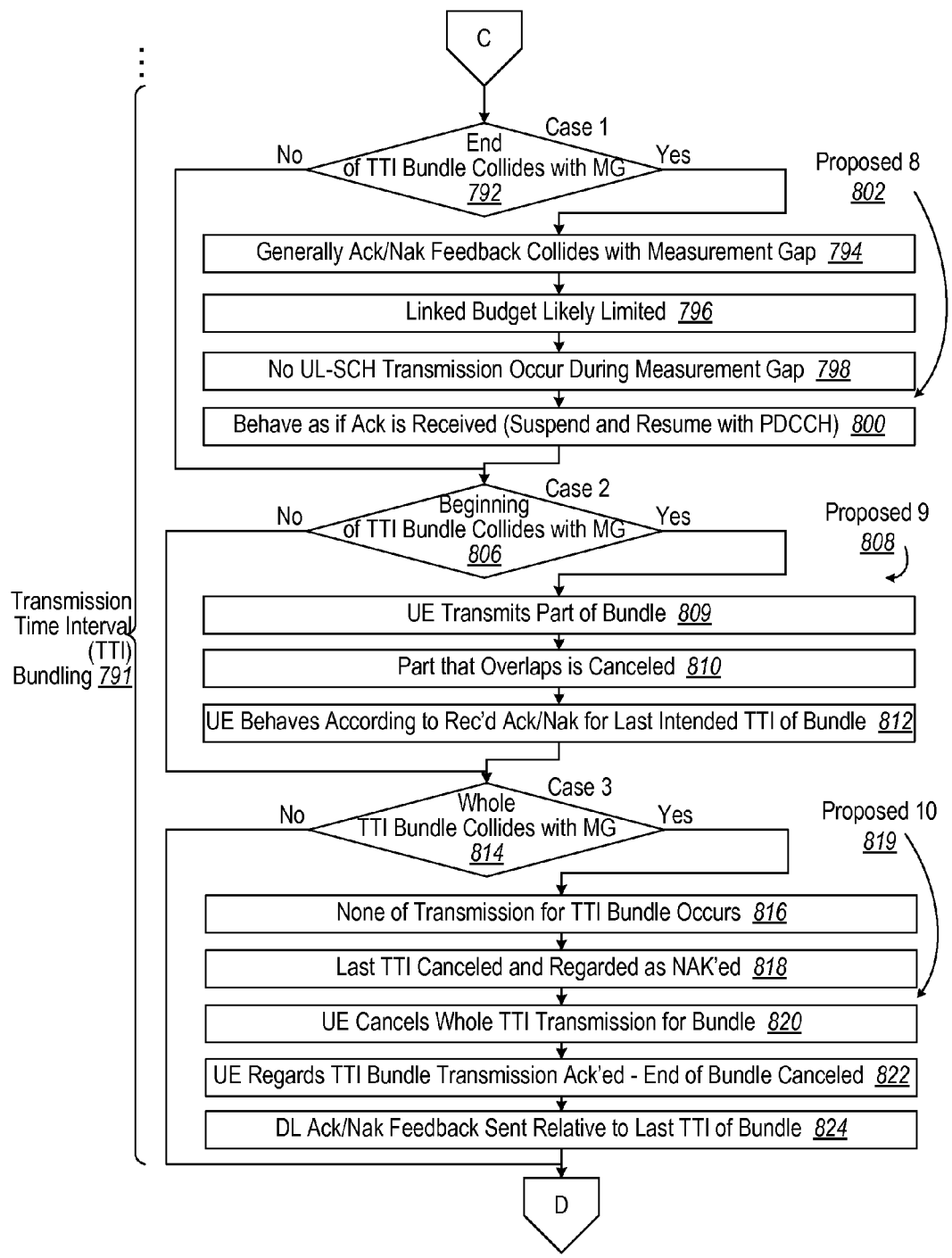
Figure 6E:
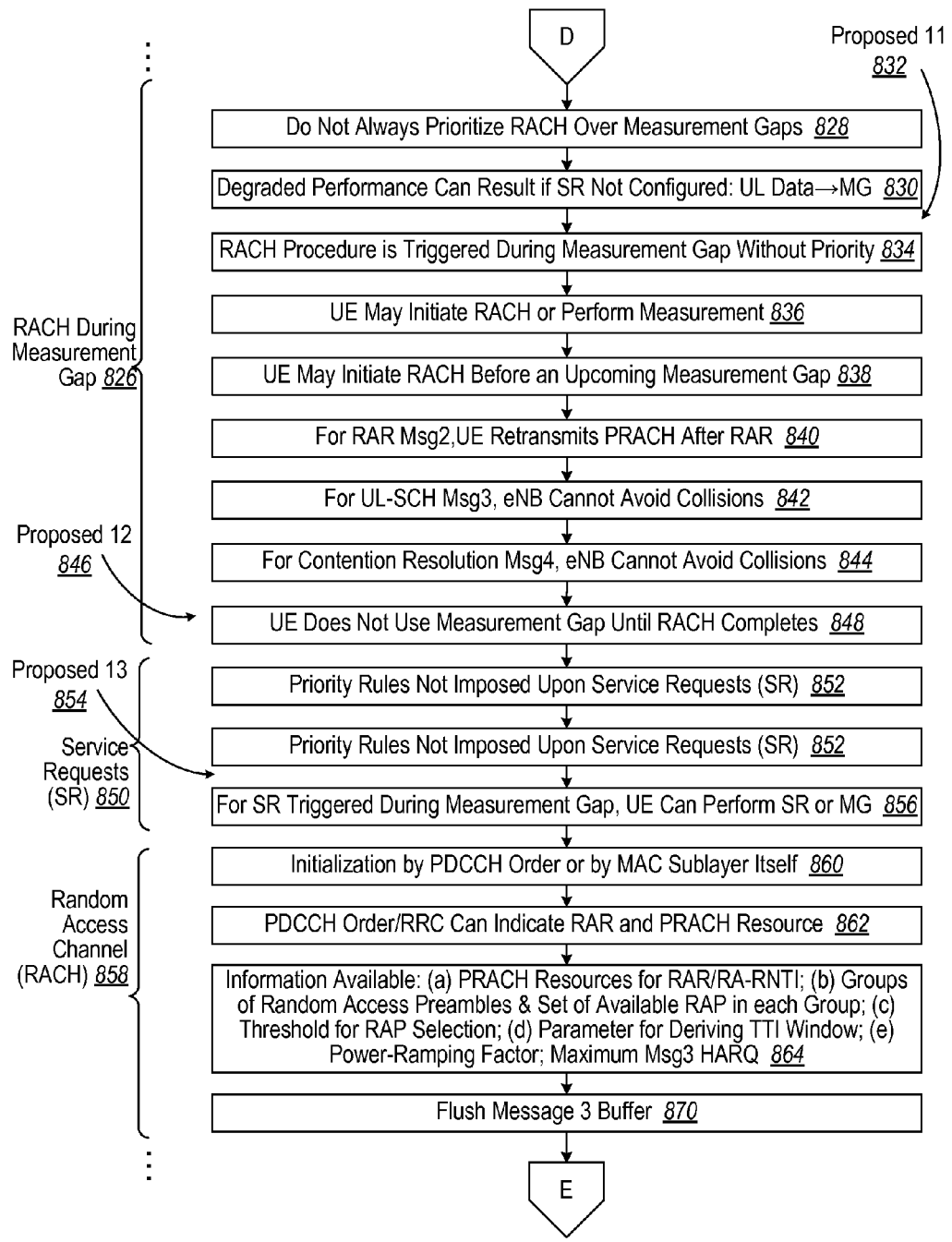
Figure 6F:
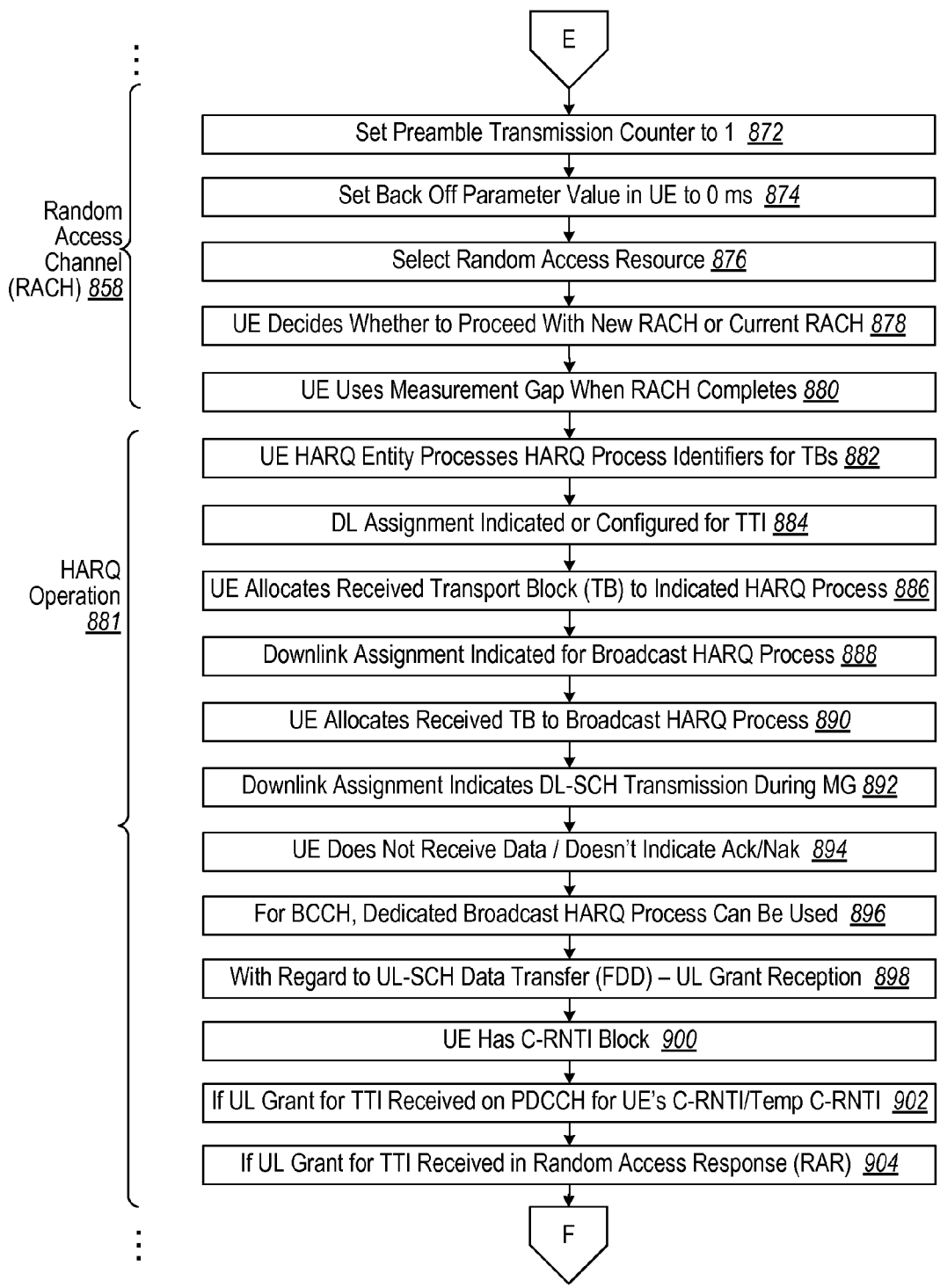
Figure 6G:
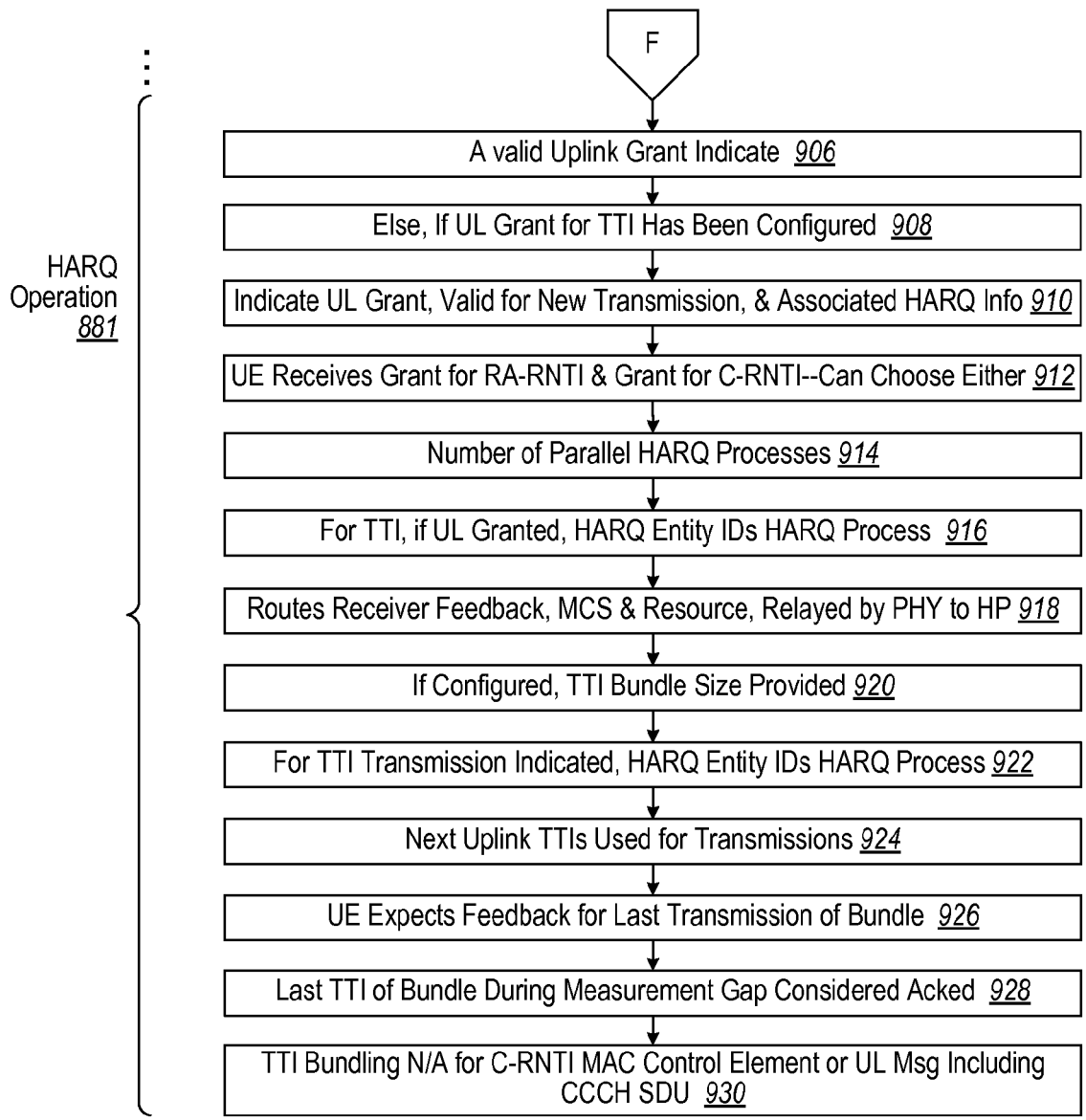

In FIG. 5, a serving radio access network (RAN), depicted as an evolved base node (eNB) 600, has a computing platform 602 that provides means such as sets of codes for causing a computer to assign measurement gaps. In particular, the computing platform 602 includes a computer readable storage medium (e.g., memory) 604 that stores a plurality of modules 606-608 executed by a processor(s) 620. A modulator 622 controlled by the processor 620 prepares a downlink signal for modulation by a transmitter 624, radiated by antenna(s) 626. A receiver 628 receives uplink signals from the antenna(s) 626 that are demodulated by a demodulator 630 and provided to the processor 620 for decoding. In particular, means (e.g., module, set of codes) 606 are provided for receiving a radio resource control (RRC) assignment on a downlink for a measurement gap for tuning from a source carrier frequency to a target carrier frequency. Means (e.g., module, set of codes) 608 are provided for determining a scheduling conflict for complying with the measurement gap. Means (e.g., module, set of codes) 608 are provided for performing a medium access control (MAC) process in accordance with a protocol predefined for the scheduling conflict.

With continued reference to FIG. 5, a mobile station, depicted as user equipment (UE) 650, has a computing platform 652 that provides means such as sets of codes for causing a computer to process measurement gaps. In particular, the computing platform 652 includes a computer readable storage medium (e.g., memory) 654 that stores a plurality of modules 656-660 executed by a processor(s) 670. A modulator 672 controlled by the processor 670 prepares an uplink signal for modulation by a transmitter 674, radiated by antenna(s) 676 as depicted at 677 to the eNB 600. A receiver 678 receives downlink signals from the eNB 600 from the antenna(s) 676 that are demodulated by a demodulator 680 and provided to the processor 670 for decoding. In particular, means (e.g., module, set of codes) 656 are for transmitting a radio resource control (RRC) assignment on a downlink for a measurement gap for tuning from a source carrier frequency to a target carrier frequency. Means (e.g., module, set of codes) 658 are for enabling user equipment to determine a scheduling conflict for complying with the measurement gap and to perform a medium access control (MAC) process in accordance with a protocol predefined for the scheduling conflict.

With reference to a further aspect depicted in FIGS. 6A-6G, a methodology or sequence of operations 700 provides for autonomy ("declaration of independence") for UE in using or ignoring at least in part measurement gaps granted by a source eNB for performing measurements for a target eNB. In DL-SCH dynamic allocation, depicted at 710, consider two cases. First, a determination is made that a DL-SCH that happens less than 3 ms (e.g., FDD, sometimes more for TDD) measurement that makes the ACK/NAK feedback collide with the measurement gap (block 712). It seems advantageous in some implementations to allow this situation to achieve better utilization of the three (3) subframes before a measurement gap and more scheduling flexibility. In a first proposed approach depicted at 714, UE behavior entails processing DL-SCH received before measurement (buffer HARQ data) (block 716). The UE does not send ACK/NAK feedback occurring during measurement and the UE is prepared to handle subsequent non-adaptive retransmissions for that process (HARQ state) (block 718). With regard to the second case, if a determination is made that DL-SCH happens during a measurement (block 720), and then UE does not process PDCCH or PDSCH during a measurement gap (block 722). In a second proposed approach depicted at 723, the UE does not process PDCCH or DL-SCH occurring during measurement gap nor does the UE send corresponding UL ACK/NAK (block 724). Thus, eNB using PDCCH during the measurement gap is an error case (block 726).

In a semi-persistent allocation depicted at 728, the eNB may want to re-allocate that DL-SCH and UL ACK/NAK resource to another UE (block 730). Again, consider two cases. First, a SPS DL-SCH that happens less than 3 ms measurement makes the ACK/NAK feedback collide with the measurement (block 732). Thereby, it is believed that there would be better utilization of the 3 subframes before a measurement gap and more scheduling flexibility. In a third proposed approach depicted at 734, UE processes DL-SCH received before measurement (buffer HARQ data) (block 736). The UE does not send ACK/NAK feedback occurring during measurement gap, as depicted at 738. UE is prepared to handle subsequent non-adaptive retransmissions for that process (HARQ state) (block 739). With regard to the second case, if SPS DL-SCH happens during a measurement gap (block 740), then UE does not process PDCCH or PDSCH during a measurement gap (block 742). However, the semi-persistent grant (for first transmission) is "received" by HARQ with current MAC specification (block 744). In a fourth proposed approach depicted at 746, UE does not process PDCCH or DL-SCH occurring during measurement gap nor send corresponding UL ACK/NAK (block 748). The SPS "UE generated" DL-grant, however, is received by MAC (block 750). No DL-SCH reception occurs with respect to the UE generated DL-grant (block 752). Subsequent retransmissions for the first transmission (that was never processed) can occur with PDCCH (block 754).

With regard to UL-SCH dynamic allocation depicted at 756, consider two cases. First, if a determination is made that PDCCH occurs 3 ms (FDD or more for TDD) before the measurement gap and the corresponding UL-SCH falls in the measurement gap (block 758). In some implementations, it can desirable to simplify eNB implementation with a specified UE behavior. In particular, the UE processes the grant as any other grant but then cancel the colliding UL-SCH transmission and regarding it as NAK'ed (block 760). Thus, in a fifth proposed approach depicted at 762, the UE cancels the UL-SCH transmission and regards it as NAK'ed. With regard to the second case, if a determination is made that PDCCH for UL-SCH occurs during the measurement map (block 764), then UE does not process PDCCH during gap. In a sixth proposed approach depicted at 766, UE does not receive PDCCH for UL grant during measurement gap (block 768). In addition, UE does not transmit on PUSCH during measurement gap (block 770).

With regard to semi-persistent allocation depicted at 772, the eNB may want to re-allocate the semi-persistently allocated UL-SCH resource during a measurement gap to another UE, and know that UE in gap will never use it (block 774). Advantageously then, when a SPS UL-SCH that happens less than 3 ms measurement makes the ACK/NAK feedback collide with the measurement (block 776), the UE can consider feedback falling within the measurement gap as ACK as previously described (block 778). With regard to the second case of interest, if a determination is made that UL SPS occasion for first transmission happens during a measurement (block 780), then UE does not process PDCCH or PDSCH during a measurement gap (block 782). Conventionally, the semi-persistent grant (for first transmission) is "received" by HARQ with current MAC specification (block 784). In a seventh proposed approach depicted at 786, the SPS "UE generated" UL-grant is received by MAC (block 788). UE cancels the UL-SCH transmission and regards it as NAK'ED. Subsequent (adaptive or non-adaptive) retransmissions for the first transmission (that was canceled) can occur with PDCCH (block 790).

With regard to TTI bundling as depicted at 791, consider three cases of interest for measurement gaps. In a first case, if a determination is made that the end of bundle collides with the measurement gap (block 792), then generally the ACK/NAK feedback also collides with gap given the length of bundle and length of gap (block 794). Canceling the whole bundle would not be desirable in many instances as the link budget is likely already limited (block 796). Similar to UL-SCH rules above, no UL-SCH transmission can occur during gap (block 798). However, considering the bundle NAK'ED in all cases will likely lead to frequent useless retransmissions given the number of TTIs already transmitted. In one aspect, it seems better to behave as if ACK is received (i.e., suspend and resume with PDCCH) (block 800). In an eighth proposed approach depicted at 802, UE transmits part of bundle that does not overlap with gap (the beginning) and cancels the part that overlaps (the end) (block 804). The UE consider that ACK is received for this bundle (i.e., suspend) (block 806). In a second case of interest, if a determination is made that the beginning of TTI bundle collides with gap, with another part that does not overlap, which in this instance allows for looking for ACK/NAK from eNB (block 807). Thus, in a ninth proposed approach depicted at 808, UE transmits part of bundle that does not overlap with gap (block 809). The part that overlaps is canceled (block 810). The UE behaves according to received ACK/NAK feedback for last 'intended' TTI of the bundle (i.e., UE could receive ACK or NAKNAK) (block 812). In a third case of interest, a determination is made that the whole TTI bundle collides with gap (block 814), such as can happen with SPS. None of the transmissions of the TTI bundle happens (block 816). In particular, the last TTI is canceled and regarded as NAK'ED (block 818). However, canceling the whole TTI bundle is rare. Therefore, in a tenth proposed approach 819, UE cancels all the transmissions of the bundle (block 820). UE regards the TTI bundle transmission as ACK'ED (because the end of bundle is canceled) (block 822). In an exemplary implementation, the DL ACK/NAK feedback is always sent relative to the last TTI of the bundle (block 824). In other words, if a bundle has four (4) subframes, the ACK/NAK timing is relative to the 4th subframe, irrespective if the 4th subframe is transmitted or not.

With regard to RACH during a measurement gap depicted at 826, it is believed advantageous to not always prioritize RACH over measurement gaps (block 828). In particular, degraded measurement performance can result if SR is not configured whenever UL data arrival aligns with measurement gaps (block 830). As an example, bundled Voice over IP (VoIP) traffic could trigger RACH every 40 ms and, has probability 6/40 of aligning with a measurement gap, if configured. On the other hand, always giving priority to measurement gap could result in delayed measurement reporting, which in turn could delay handover and raise the likelihood of failed handover. Given the above and considering also that irrespective of which rule (if any) is selected, there is no interoperability impact, in an eleventh proposed approach depicted at 832, when a RACH procedure is triggered during a measurement gap (block 834), there is no need to specify what takes priority; UE may initiate RACH or perform the measurement (block 836). With regard to commitment to an ongoing RACH during a measurement gap, UE may have initiated RACH before an upcoming measurement gap (block 838). UE is not expected to "look forward" to future gaps before performing autonomous transmissions. In particular the messages listed below may collide with a measurement gap. With regard to message 2 (Random Access Response (RAR)), a consequence if missed is that UE will retransmit PRACH at next occasion after RAR response window expires, generating extra PRACH and RAR load (block 840). With regard to message 3 (first UL-SCH message), note that with contention based RACH, eNB does not know which C-RNTI is getting that grant, so eNB cannot avoid collisions of MSG3 with measurement gaps (block 842). With regard to message 4 (contention resolution message), by the time MSG4 is transmitted, if the UE has measurement gaps (is connected), the eNB can avoid sending the MSG4 during a gap (block 844). Note that Contention Resource Timer can be selected appropriately. In a twelfth proposed approach depicted at 846 is for when a UE has initiated a RACH procedure. UE does not use the measurement gaps until the procedure completes, which avoids wasting bandwidth (block 848). While it is true that eNB could schedule message 4 around measurements, it would complicate an implementation to have UE not use the measurement gaps for message 2 and message 3 and re-allow UE to use measurements for message 4. Thereby, contention resolution is expedited in that the eNB and UE implementation is kept simple.

With regard to service requests (SR) as depicted at 850, it is advantageous in one aspect to not impose a rule for all uses cases and further not to specify whether SR or measurements gaps have priority (block 852). Thus, in a thirteenth proposed approach depicted at 854, when SR is triggered during a measurement gap, there is no need to specify what takes priority. UE may transmit SR or perform the measurement (block 856).

With regard to Random Access (RACH) procedure depicted at 858, initialization can be by a PDCCH order or by the MAC sublayer itself (block 860). The PDCCH order or RRC optionally indicate a Random Access Preamble and PRACH resource (block 862). Before the procedure is initiated, the following information is assumed to be available (block 864):

The available set of PRACH resources for the transmission of the Random Access Preamble and their corresponding RA-RNTI.

The groups of Random Access Preambles and the set of available Random Access Preambles in each group.

The thresholds required for selecting one of the two groups of Random Access Preambles.

Parameters required to derive the TTI window.

The power-ramping factor POWER_RAMP_STEP.

The parameter PREAMBLE_TRANS_MAX {integer>0}.

The initial preamble power PREAMBLE_INITIAL_RECEIVED_TARGET_POWER.

The parameter Maximum number of Message3 HARQ transmissions.

It should be noted that the above parameters may be updated from higher layers before each Random Access procedure is initiated.

The Random Access procedure can be performed as follows:

Flush the {Message3 } buffer (block 870);
set the PREAMBLE_TRANSMISSION_COUNTER to 1 (block 872);
set the back off parameter value in the UE to 0 ms (block 874);
proceed to the selection of the Random Access Resource (block 876).

It should be noted in one aspect that only one Random Access procedure ongoing at any point in time. If the UE receives a request for a new Random Access procedure while another is already ongoing, it is up to UE implementation whether to continue with the ongoing procedure or start with the new procedure (block 878).

If measurement gaps are configured, when a Random Access procedure is ongoing the UE does not use the measurement gaps as described above with regard to the twelfth proposed approach (block 880).

With regard to HARQ operation 881, there is one HARQ entity at the UE that processes the HARQ process identifiers indicated by the HARQ information associated with transport blocks (TBs) received on the DL-SCH and directs the received data to the corresponding HARQ process for reception operations (block 882). A number of parallel HARQ processes are used in the UE to support the HARQ entity. (The number of HARQ processes is FFS.)

If a downlink assignment has been indicated or configured for this TTI (block 884), the UE allocates the received TB to the HARQ process indicated by the associated HARQ information (block 886). If a downlink assignment has been indicated for the broadcast HARQ process (block 888), the UE allocates the received TB to the broadcast HARQ process (block 890).

When a configured downlink assignment indicates DL-SCH transmission that occurs during a measurement gap (block 892), UE does not receive data and shall not indicate corresponding positive or negative acknowledgement in accordance with the fourth proposed approach above (block 894). It should be noted that in case of BCCH a dedicated broadcast HARQ process can be used (block 896).

With regard to UL-SCH data transfer by at least FDD depicted at 898, a UL grant reception can entail the following. When the UE has a C-RNTI (block 900), Semi-Persistent Scheduling (SPS) C-RNTI, or Temporary C-RNTI, the UE can for each TTI:

If an uplink grant for this TTI has been received on the PDCCH for the UE's C-RNTI or Temporary C-RNTI (block 902); or If an uplink grant for this TTI has been received in a Random Access Response (block 904):

Indicate a valid uplink grant and the associated HARQ information to the HARQ entity for this TTI (Block 906).

Else, if an uplink grant for this TTI has been configured (block 908):

Indicate an uplink grant, valid for new transmission, and the associated HARQ information to the HARQ entity for this TTI (block 910).

It should be noted that the period of configured uplink grants is expressed in TTIs. It should be further noted that if the UE receives both a grant for its RA-RNTI and a grant for its C-RNTI, the UE may choose to continue with either the grant for its RA-RNTI or the grant for its C-RNTI (block 912).

With regard HARQ entity at UE, a number of parallel HARQ processes are used in the UE to support the HARQ entity, allowing transmissions to take place continuously while waiting for the feedback on the successful or unsuccessful reception of previous transmissions (block 914). At a given TTI, if an uplink grant is indicated for the TTI, the HARQ entity identifies the HARQ process for which a transmission should take place (block 916). It also routes the receiver feedback (ACK/NACK information), MCS and resource, relayed by the physical layer, to the appropriate HARQ process (block 918). If TTI bundling is configured, the parameter TTI_BUNDLE_SIZE provides the number of TTIs of a TTI bundle (block 920). If a transmission is indicated for the TTI, the HARQ entity identifies the HARQ process for which a transmission should take place (block 922). The next TTI_BUNDLE_SIZE uplink TTIs are subsequently used for transmissions for the identified HARQ process (block 924). HARQ retransmissions within a bundle shall be performed without waiting for feedback from previous transmissions according to TTI_BUNDLE_SIZE. The UE expects feedback only for the last transmission of a bundle (block 926). When the last TTI of a bundle is not transmitted due to a measurement, the UE considers the feedback for this bundle to be HARQ ACK, as provided above in proposed approaches nine and ten (block 928).

TTI bundling does not apply for transmission of an uplink message containing the C-RNTI MAC control element or an uplink message including a Common Control Channel (CCCH) Service Data Unit (SDU) during Random Access (block 930). Consider that the number of HARQ processes is equal to {X} {FFS}. Each process is associated with a number from 0 to {X−1}. At the given TTI, the HARQ entity can:

If an uplink grant indicating that the NDI has been incremented compared to the value in the previous transmission of this HARQ process is indicated for this TTI or if this is the very first transmission for this HARQ process (i.e. a new transmission takes place for this HARQ process):

If there is an ongoing Random Access procedure and there is a MAC PDU in the {Message3} buffer:

Obtain the MAC PDU to transmit from the {Message3} buffer.

Else, if the "uplink prioritization" entity indicates the need for a new transmission:

Obtain the MAC PDU to transmit from the "Multiplexing and assembly" entity;

Instruct the HARQ process corresponding to this TTI to trigger a new transmission using the identified parameters.

Else:

Flush the HARQ buffer.

Else, if an uplink grant, indicating that the NDI is identical to the value in the previous transmission of this HARQ process (i.e. a retransmission takes place for this HARQ process), is indicated for this TTI:

Instruct the HARQ process to generate an adaptive retransmission.

Else, if the HARQ buffer of the HARQ process corresponding to this TTI is not empty:

Instruct the HARQ process to generate a non-adaptive retransmission.

It should be noted that retransmission triggered by the HARQ entity should be canceled by the corresponding HARQ process if it collides with a measurement gap or if a non-adaptive retransmission is not allowed.

Each HARQ process is associated with a HARQ buffer. Each HARQ process maintains a state variable CURRENT_TX_NB, which indicates the number of transmissions that have taken place for the MAC packet data unit (PDU) currently in the buffer. When the HARQ process is established, CURRENT_TX_NB can be initialized to 0. The sequence of redundancy versions can be defined to be 0, 2, 3, 1. The variable CURRENT_IRV provides a pointer to a redundancy version in the defined set. This variable is updated modulo 4. New transmissions and adaptive retransmissions are performed on the resource and with the MCS indicated on PDCCH, while a non-adaptive retransmission is performed on the same resource and with the same MCS as was used for the last made transmission attempt, the UE is configured with a Maximum number of HARQ transmissions and a Maximum number of Message3 HARQ transmissions by RRC. For transmissions on all HARQ processes and all logical channels except for transmission of a MAC PDU stored in the {Message3} buffer, maximum number of transmissions shall be set to maximum number of HARQ transmissions. For transmission of a MAC PDU stored in the {Message3} buffer, maximum number of transmissions shall be set to maximum number of Message3 HARQ transmissions.

If the HARQ entity requests a new transmission, the HARQ process:

set CURRENT_TX_NB to 0;
set CURRENT_IRV to 0;
store the MAC PDU in the associated HARQ buffer;
if there is not measurement gap at the time of the transmission: (proposed approaches five and eight)
generate a transmission as described below.
Else:
do not generate a transmission and consider the feedback for this transmission to be HARQ NAK. (proposed approaches five and eight)

If the HARQ entity requests a retransmission, the HARQ process:

increment CURRENT_TX_NB by 1;
if there is no measurement gap at the time of the retransmission:
for an adaptive retransmission:
set CURRENT_IRV to the value corresponding to the redundancy version indicated on PDCCH;
generate a transmission as described below.
For a non-adaptive retransmission:
if the last feedback for this HARQ process is a HARQ NACK:
generate a transmission as described below.

It should be noted that when receiving a HARQ ACK alone, the UE keeps the data in the HARQ buffer.

To generate a transmission, the HARQ process:
instructs the physical layer to generate a transmission with the redundancy version corresponding to the CURRENT_IRV value and the transmission timing;
increment CURRENT_IRV by 1;
if there is a measurement gap at the time of the feedback for this transmission, consider the feedback coinciding with the measurement gap to be a HARQ ACK.

The HARQ process:
if CURRENT_TX_NB=maximum number of transmissions:
flush the HARQ buffer;
if the transmission corresponds to a transmission of CCCH; and
if the last feedback received (i.e., the feedback received for the last transmission of this process) is a HARQ NACK:
notify RRC that the transmission of the corresponding MAC SDU failed. The HARQ process may:
if CURRENT_TX_NB=maximum number of transmissions configured; and
if the last feedback received (i.e., the feedback received for the last transmission of this process) is a HARQ NACK:
notify the relevant ARQ entities in the upper layer that the transmission of the corresponding RLC PDUs failed.

Figure 7:
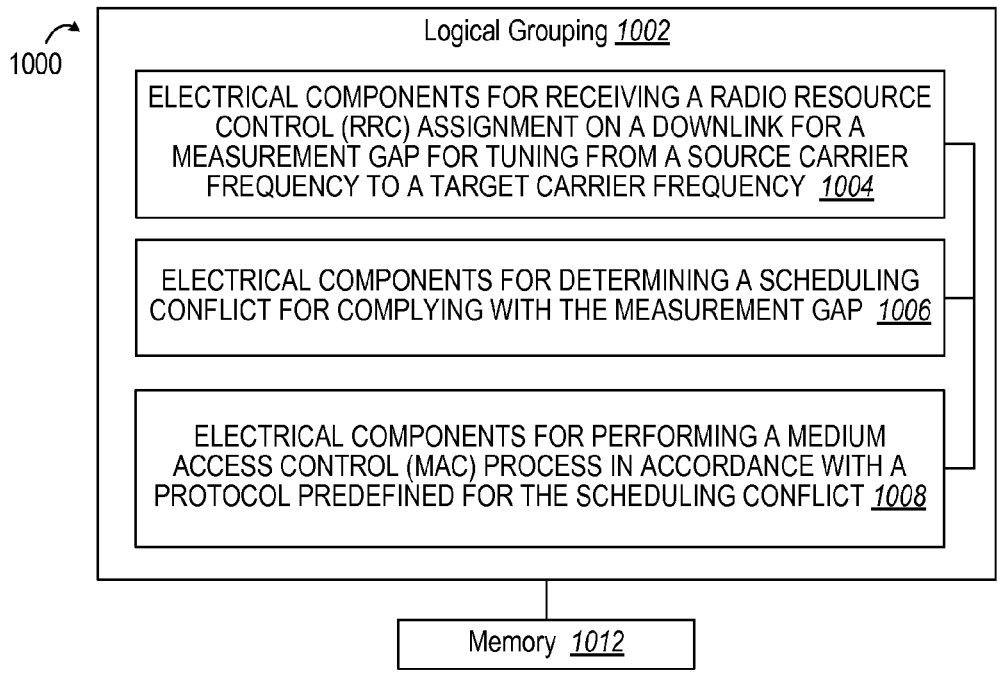
FIG. 7 illustrates a block diagram of a system comprising logical grouping of electrical components for processing measurement gaps.

With reference to FIG. 7, illustrated is a system 1000 that enables processing measurement gaps. For example, system 1000 can reside at least partially within user equipment (UE). It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a radio resource control (RRC) assignment on a downlink for a measurement gap for tuning from a source carrier frequency to a target carrier frequency 1004. Moreover, logical grouping 1002 can include an electrical component for determining a scheduling conflict for complying with the measurement gap 1006. Further, logical grouping 1002 can include an electrical component for performing a medium access control (MAC) process in accordance with a protocol predefined for the scheduling conflict 1008. Additionally, system 1000 can include a memory 1012 that retains instructions for executing functions associated with electrical components 1004, 1006, 1008. While shown as being external to memory 1012, it is to be understood that one or more of electrical components 1004, 1006 and 1008 can exist within memory 1012.

Figure 8:
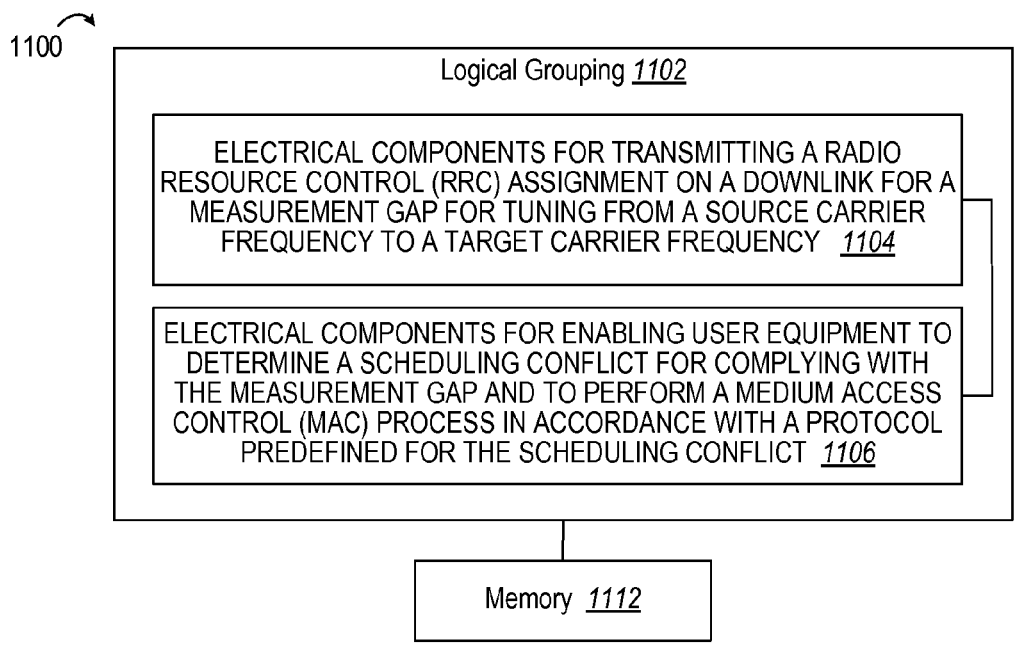
FIG. 8 illustrates a block diagram of a system comprising logical grouping of electrical components for assigning measurement gaps.

With reference to FIG. 8, illustrated is a system 1100 that enables assigning and enabling use of measurement gaps. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for transmitting a radio resource control (RRC) assignment on a downlink for a measurement gap for tuning from a source carrier frequency to a target carrier frequency 1104. In addition, logical grouping 1102 can include an electrical component for enabling user equipment to determine a scheduling conflict for complying with the measurement gap and to perform a medium access control (MAC) process in accordance with a protocol predefined for the scheduling conflict 1106. Additionally, system 1100 can include a memory 1112 that retains instructions for executing functions associated with electrical components 1104 and 1106. While shown as being external to memory 1112, it is to be understood that one or more of electrical components 1104 and 1106 can exist within memory 1112.

Figure 9:
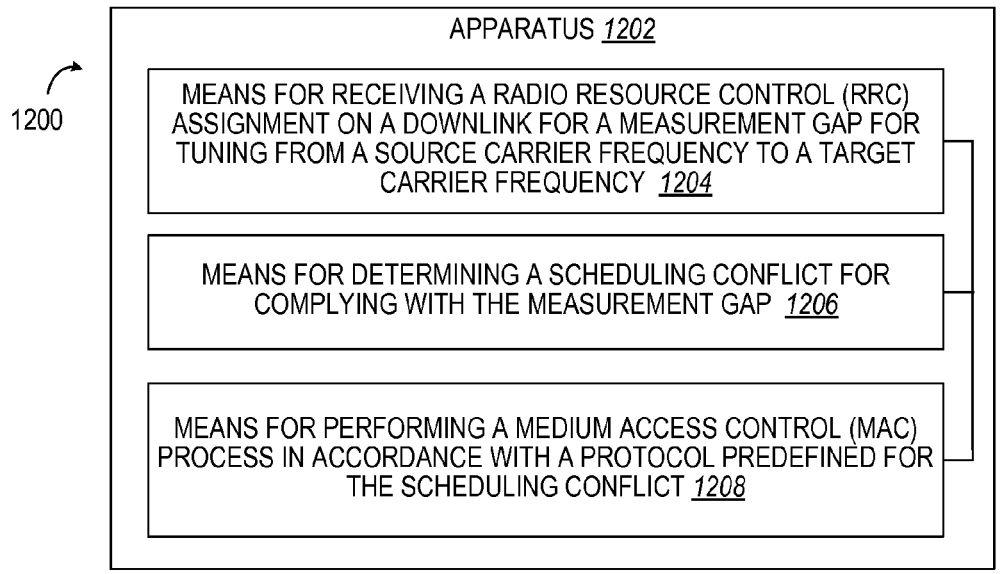
FIG. 9 illustrates a block diagram of a system comprising means for processing measurement gaps.

With reference to FIG. 9, illustrated is a system 1200 that enables processing measurement gaps. For example, system 1200 can reside at least partially within user equipment (UE). It is to be appreciated that system 1200 is represented as including functional blocks, which can be functional blocks that represent functions implemented by a processor, software, or combination thereof (e.g., firmware). System 1200 includes an apparatus 1202 having means for receiving a radio resource control (RRC) assignment on a downlink for a measurement gap for tuning from a source carrier frequency to a target carrier frequency 1204. Moreover, apparatus 1202 can include means for determining a scheduling conflict for complying with the measurement gap 1206. Further, apparatus 1002 can include means for performing a medium access control (MAC) process in accordance with a protocol predefined for the scheduling conflict 1208.

Figure 10:
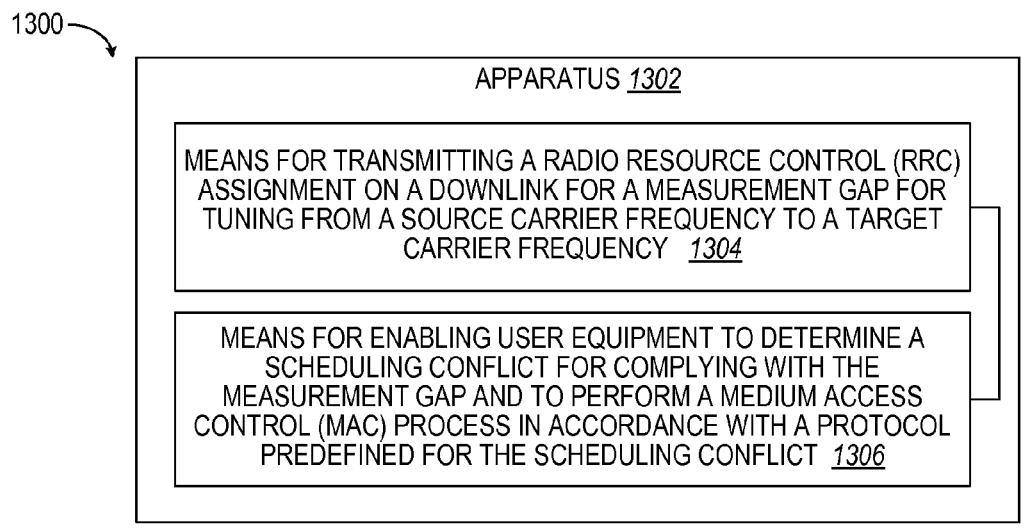
FIG. 10 illustrates a block diagram of a system comprising means for assigning measurement gaps.

With reference to FIG. 10, illustrated is a system 1300 that enables assigning and enabling use of measurement gaps. For example, system 1300 can reside at least partially within a base station. It is to be appreciated that system 1300 is represented as including functional blocks, which can be functional blocks that represent functions implemented by a processor, software, or combination thereof (e.g., firmware). System 1300 includes an apparatus 1302 having means for transmitting a radio resource control (RRC) assignment on a downlink for a measurement gap for tuning from a source carrier frequency to a target carrier frequency 1304. In addition, apparatus 1302 can have means for enabling user equipment to determine a scheduling conflict for complying with the measurement gap and to perform a medium access control (MAC) process in accordance with a protocol predefined for the scheduling conflict 1306.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for processing a measurement gap, comprising:
   receiving a radio resource control (RRC) assignment on a downlink for a measurement gap for tuning from a source carrier frequency to a target carrier frequency;
   determining a scheduling conflict arising from a beginning portion of a transmission time interval (TTI) bundle colliding with the measurement gap, an end portion of a TTI bundle colliding with the measurement gap, or an entire TTI bundle colliding with the measurement gap; and
   performing a medium access control (MAC) process in accordance with a protocol predefined for the scheduling conflict by transmitting a portion of the TTI bundle that does not overlap with the measurement gap and canceling the colliding portion.

2. The method of claim 1, wherein:
   the scheduling conflict arises from an end of the TTI bundle colliding with the measurement gap;
   the portion of the TTI bundle that does not overlap with the measurement gap is a beginning portion of the TTI bundle;
   the colliding portion of the TTI bundle that overlaps with the measurement gap is a colliding end portion of the TTI bundle; and
   the MAC process further comprises:
      using ACK/NAK feedback for a last intended TTI of the bundle, if an ACK/NAK is received, and
      considering this bundle acknowledged if an ACK/NAK for the last intended TTI of the TTI bundle is not received and collides with the measurement gap.

3. The method of claim 1, wherein:
   the scheduling conflict arises from a beginning of the TTI bundle colliding with the measurement gap;
   the portion of the TTI bundle that does not overlap with the measurement gap is an ending portion of the TTI bundle;
   the colliding portion of the TTI bundle that overlaps with the measurement gap is a colliding beginning portion of the TTI bundle; and
   the MAC process further comprises behaving in accordance with ACK/NAK feedback received for a last intended TTI of the bundle.

4. The method of claim 1, wherein:
   the scheduling conflict arises from the entire TTI bundle colliding with the measurement gap;
   the colliding portion of the TTI bundle that overlaps with the measurement gap is the entire TTI bundle; and
   the MAC process further comprises considering not acknowledged for the TTI bundle.

5. A computer program product for processing a measurement gap stored on a computer-readable storage medium and comprising code for causing at least one processor to:
   receive a radio resource control (RRC) assignment on a downlink for a measurement gap for tuning from a source carrier frequency to a target carrier frequency;
   determine a scheduling conflict arising from a beginning portion of a transmission time interval (TTI) bundle colliding with the measurement gap, an end portion of a TTI bundle colliding with the measurement gap, or an entire TTI bundle colliding with the measurement gap; and
   perform a medium access control (MAC) process in accordance with a protocol predefined for the scheduling conflict by transmitting a portion of the TTI bundle that does not overlap with the measurement gap and canceling the colliding portion.

6. An apparatus for processing a measurement gap, comprising:
   means for receiving a radio resource control (RRC) assignment on a downlink for a measurement gap for tuning from a source carrier frequency to a target carrier frequency;
   means for determining a scheduling conflict arising from a beginning portion of a transmission time interval (TTI) bundle colliding with the measurement gap, an end portion of a TTI bundle colliding with the measurement gap, or an entire TTI bundle colliding with the measurement gap; and
   means for performing a medium access control (MAC) process in accordance with a protocol predefined for the scheduling conflict by transmitting a portion of the TTI bundle that does not overlap with the measurement gap and canceling the colliding portion.

7. An apparatus for processing a measurement gap, comprising:
- a receiver for receiving a radio resource control (RRC) assignment on a downlink for a measurement gap for tuning from a source carrier frequency to a target carrier frequency;
- a transmitter;
- a memory; and
- at least one processor coupled to said memory and configured to:
  - determine a scheduling conflict arising from a beginning portion of a transmission time interval (TTI) bundle colliding with the measurement gap, an end portion of a TTI bundle colliding with the measurement gap, or an entire TTI bundle colliding with the measurement gap, and
  - perform a medium access control (MAC) process via the transmitter and receiver in accordance with a protocol predefined for the scheduling conflict by transmitting a portion of the TTI bundle that does not overlap with the measurement gap and canceling the colliding portion.

8. The apparatus of claim 7, wherein:
- the scheduling conflict arises from an end of the TTI bundle colliding with the measurement gap;
- the portion of the TTI bundle that does not overlap with the measurement gap is a beginning portion of the TTI bundle;
- the colliding portion of the TTI bundle that overlaps with the measurement gap is a colliding end portion of the TTI bundle; and
- the MAC process further comprises using ACK/NAK feedback for a last intended TTI of the bundle, if an ACK/NAK is received, and considering this bundle acknowledged if an ACK/NAK for the last intended TTI of the TTI bundle is not received and collides with the measurement gap.

9. The apparatus of claim 7, wherein:
- the scheduling conflict arises from a beginning of the TTI bundle colliding with the measurement gap;
- the portion of the TTI bundle that does not overlap with the measurement gap is an ending portion of the TTI bundle;
- the colliding portion of the TTI bundle that overlaps with the measurement gap is a colliding beginning portion of the TTI bundle; and
- the MAC process further comprises behaving in accordance with ACK/NAK feedback received for a last intended TTI of the bundle.

10. The apparatus of claim 7, wherein:
- the scheduling conflict arises from the entire TTI bundle colliding with the measurement gap;
- the colliding portion of the TTI bundle that overlaps with the measurement gap is the entire TTI bundle; and
- the MAC process further comprises considering not acknowledged for the TTI bundle.

11. A method for assigning a measurement gap, comprising:
- transmitting a radio resource control (RRC) assignment on a downlink for a measurement gap for tuning from a source carrier frequency to a target carrier frequency; and
- enabling user equipment to:
  - determine a scheduling conflict arising from a beginning portion of a transmission time interval (TTI) bundle colliding with the measurement gap, an end portion of a TTI bundle colliding with the measurement gap, or an entire TTI bundle colliding with the measurement gap; and
  - perform a medium access control (MAC) process in accordance with a protocol predefined for the scheduling conflict by transmitting a portion of the TTI bundle that does not overlap with the measurement gap and canceling the colliding portion.

12. The method of claim 11, wherein:
- the scheduling conflict arises from an end of the TTI bundle colliding with the measurement gap,
- the portion of the TTI bundle that does not overlap with the measurement gap is a beginning portion of the TTI bundle;
- the colliding portion of the TTI bundle that overlaps with the measurement gap is a colliding end portion of the TTI bundle; and
- the MAC process further comprises using ACK/NAK feedback for a last intended TTI of the bundle, if an ACK/NAK is received, and considering this bundle acknowledged if an ACK/NAK for the last intended TTI of the TTI bundle is not received and collides with the measurement gap.

13. The method of claim 11,
- the scheduling conflict arises from a beginning of the TTI bundle colliding with the measurement gap;
- the portion of the TTI bundle that does not overlap with the measurement gap is an ending portion of the TTI bundle;
- the colliding portion of the TTI bundle that overlaps with the measurement gap is a colliding beginning portion of the TTI bundle; and
- the MAC process further comprises behaving in accordance with ACK/NAK feedback received for a last intended TTI of the bundle.

14. The method of claim 11, wherein:
- the scheduling conflict arises from the entire TTI bundle colliding with the measurement gap;
- the colliding portion of the TTI bundle that overlaps with the measurement gap is the entire TTI bundle; and
- the MAC process further comprises considering not acknowledged for the TTI bundle.

15. A computer program product for assigning a measurement gap stored on a computer-readable storage medium and comprising code for causing at least one processor to:
- transmit a radio resource control (RRC) assignment on a downlink for a measurement gap for tuning from a source carrier frequency to a target carrier frequency; and
- enable user equipment to:
  - determine a scheduling conflict arising from a beginning portion of a transmission time interval (TTI) bundle colliding with the measurement gap, an end portion of a TTI bundle colliding with the measurement gap, or an entire TTI bundle colliding with the measurement gap; and
  - perform a medium access control (MAC) process in accordance with a protocol predefined for the scheduling conflict by transmitting a portion of the TTI bundle that does not overlap with the measurement gap and canceling the colliding portion.

16. An apparatus for assigning a measurement gap, comprising:
- means for transmitting a radio resource control (RRC) assignment on a downlink for a measurement gap for tuning from a source carrier frequency to a target carrier frequency; and means for enabling user equipment to:
    determine a scheduling conflict arising from a beginning portion of a transmission time interval (TTI) bundle colliding with the measurement gap, an end portion of a TTI bundle colliding with the measurement gap, or an entire TTI bundle colliding with the measurement gap; and
    perform a medium access control (MAC) process in accordance with a protocol predefined for the scheduling conflict by transmitting a portion of the TTI bundle that does not overlap with the measurement gap and canceling the colliding portion.

17. An apparatus for assigning a measurement gap, comprising:
    a transmitter for transmitting a radio resource control (RRC) assignment on a downlink for a measurement gap for tuning from a source carrier frequency to a target carrier frequency;
    a receiver;
    a memory; and
    at least one processor coupled to said memory and configured for enabling user equipment via the transmitter and receiver to:
        determine a scheduling conflict arising from a beginning portion of a transmission time interval (TTI) bundle colliding with the measurement gap, an end portion of a TTI bundle colliding with the measurement gap, or an entire TTI bundle colliding with the measurement gap; and
        perform a medium access control (MAC) process in accordance with a protocol predefined for the scheduling conflict by transmitting a portion of the TTI bundle that does not overlap with the measurement gap and canceling the colliding portion.

18. The apparatus of claim 17, wherein:
    the scheduling conflict arises from an end of the TTI bundle colliding with the measurement gap;
    the portion of the TTI bundle that does not overlap with the measurement gap is a beginning portion of the TTI bundle;
    the colliding portion of the TTI bundle that overlaps with the measurement gap is a colliding end portion of the TTI bundle; and
    the MAC process further comprises using ACK/NAK feedback for a last intended TTI of the bundle if an ACK/NAK is received, and considering this bundle acknowledged if an ACK/NAK for the last intended TTI of the TTI bundle is not received and collides with the measurement gap.

19. The apparatus of claim 17, wherein:
    the scheduling conflict arises from a beginning of the TTI bundle colliding with the measurement gap;
    the portion of the TTI bundle that does not overlap with the measurement gap is an ending portion of the TTI bundle;
    the colliding portion of the TTI bundle that overlaps with the measurement gap is a colliding beginning portion of the TTI bundle; and
    the MAC process further comprises behaving in accordance with ACK/NAK feedback received for a last intended TTI of the bundle.

20. The apparatus of claim 17, wherein:
    the scheduling conflict arises from the entire TTI bundle colliding with the measurement gap;
    the colliding portion of the TTI bundle that overlaps with the measurement gap is the entire TTI bundle; and
    the MAC process further comprises considering not acknowledged for the TTI bundle.

* * * * *